(12) United States Patent
Osaki et al.

(10) Patent No.: US 7,697,165 B2
(45) Date of Patent: Apr. 13, 2010

(54) GAMUT COMPRESSION METHOD, PROGRAM, AND GAMUT COMPRESSION DEVICE

(75) Inventors: Yuki Osaki, Kanagawa (JP); Norihiko Kawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 11/517,460

(22) Filed: Sep. 7, 2006

(65) Prior Publication Data

US 2007/0058183 A1    Mar. 15, 2007

(30) Foreign Application Priority Data

Sep. 8, 2005    (JP)    ............... 2005-260699

(51) Int. Cl.
  *H04N 1/60*    (2006.01)
(52) U.S. Cl. ........................ 358/1.9; 358/518
(58) Field of Classification Search ................. 358/1.1, 358/1.9, 3.23, 500, 501, 518, 521, 523; 382/162, 382/166, 167
  See application file for complete search history.

(56) References Cited

U.S. PATENT DOCUMENTS 5,844,699 A * 12/1998 Usami et al. ................ 358/518
6,101,272 A    8/2000 Noguchi
6,414,690 B1 * 7/2002 Balasubramanian et al. 345/589
2003/0020934 A1    1/2003 Nishida
2003/0165266 A1    9/2003 Kagawa et al.

FOREIGN PATENT DOCUMENTS

| JP | 10 229502 | 8/1998 |
| JP | 2002 94826 | 3/2002 |
| JP | 2003 37745 | 2/2003 |
| JP | 2003 244457 | 8/2003 |

OTHER PUBLICATIONS

Jan Morovic and M. Ronnier Luo: The Fundamentals of Gamut Mapping: A Survey, Journal of Imaging Science and Technology vol. 45, No. 3, May-Jun. 2001.

* cited by examiner

*Primary Examiner*—Thomas D Lee
(74) *Attorney, Agent, or Firm*—Frommer Lawrence & Haug LLP; William S. Frommer; Thomas F. Presson

(57) ABSTRACT

A gamut compressing device for compressing video data in a first gamut into video data in a second gamut. The device includes a compression unit compressing a value of color data in the first gamut, not contained in the second gamut, into a value of color data contained in the second gamut through a predetermined compression calculation. A gradation generating unit generates gradation such that a plurality of values of color data having the same value as a result of the compression become different in the second gamut.

7 Claims, 19 Drawing Sheets

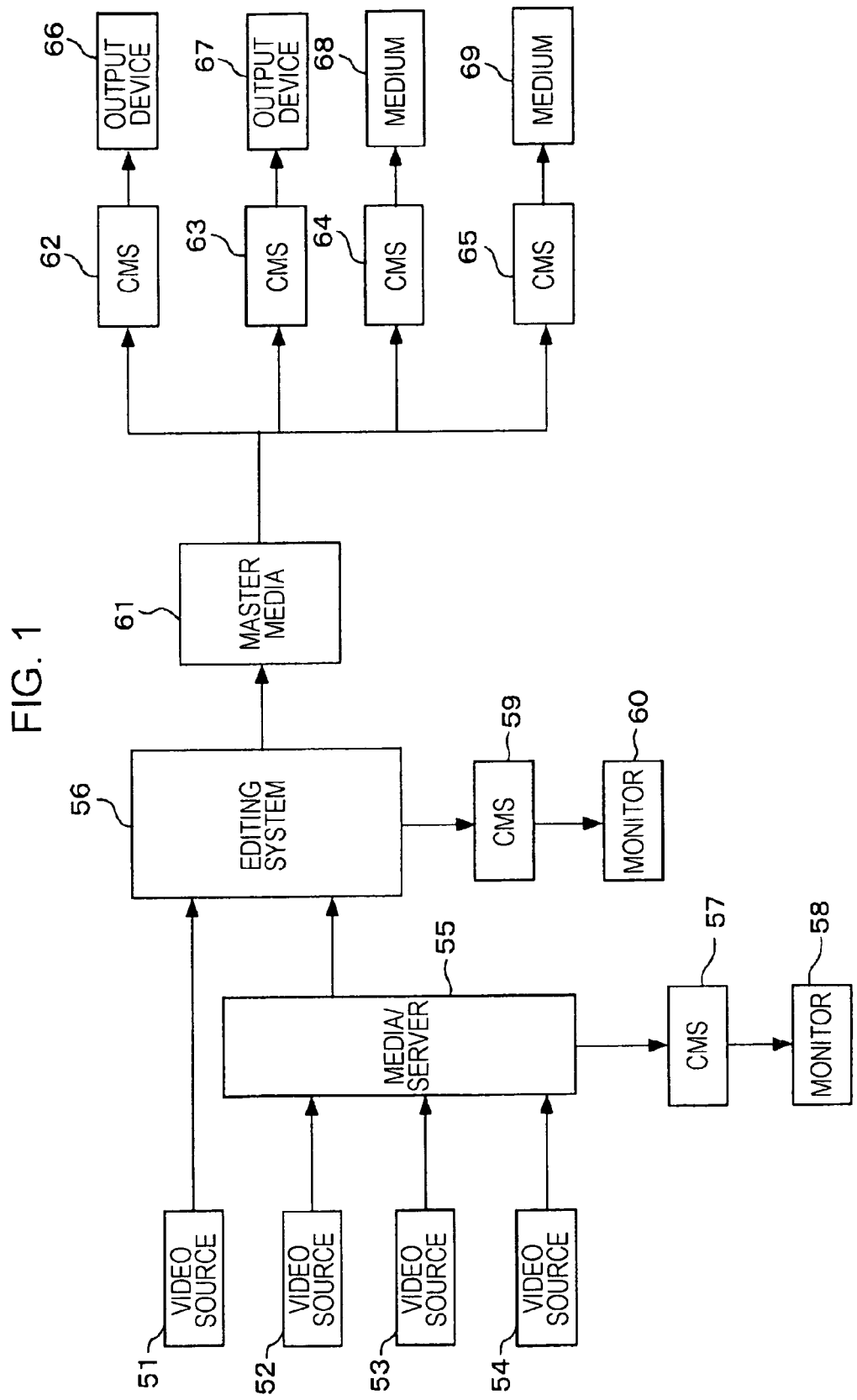

| LATTICE POINTS WITHIN RANGE OF 0.00 TO 1.0 |
|---|
| (x0, y0, z0) |
| (x0, y1, z0) |
| . |
| . |
| . |
| (xa, yb, zc) |

| LATTICE POINTS OUTSIDE RANGE OF 0.00 TO 1.0 |
|---|
| (x1, y0, z0) |
| (x0, y3, z1) |
| . |
| . |
| . |
| (xd, xe, zf) |

LUT#3

○ : LCH VALUES OF INPUT RGB VALUES

LUT#4

■ : COMPRESSED LCH VALUES

COMPRESS AND OVERWRITE

LUT#4

○ : LCH VALUES OF INPUT RGB VALUES

LUT#5

FIG. 13

| GROUP | LATTICE POINTS | | | |
|---|---|---|---|---|
| GP1 | (xa, yb, zc) | (xa+1, yb, zc) | | |
| GP2 | (xb, yb, zb) | (xb, yb+1, zb) | (xb, yb+2, zb) | |
| GP3 | (xp, yq, zr) | (xp, yp, zp) | | |
| ... | | | | |

INPUT G

INPUT B

INPUT R

▲ : OUTPUT RGB VALUES

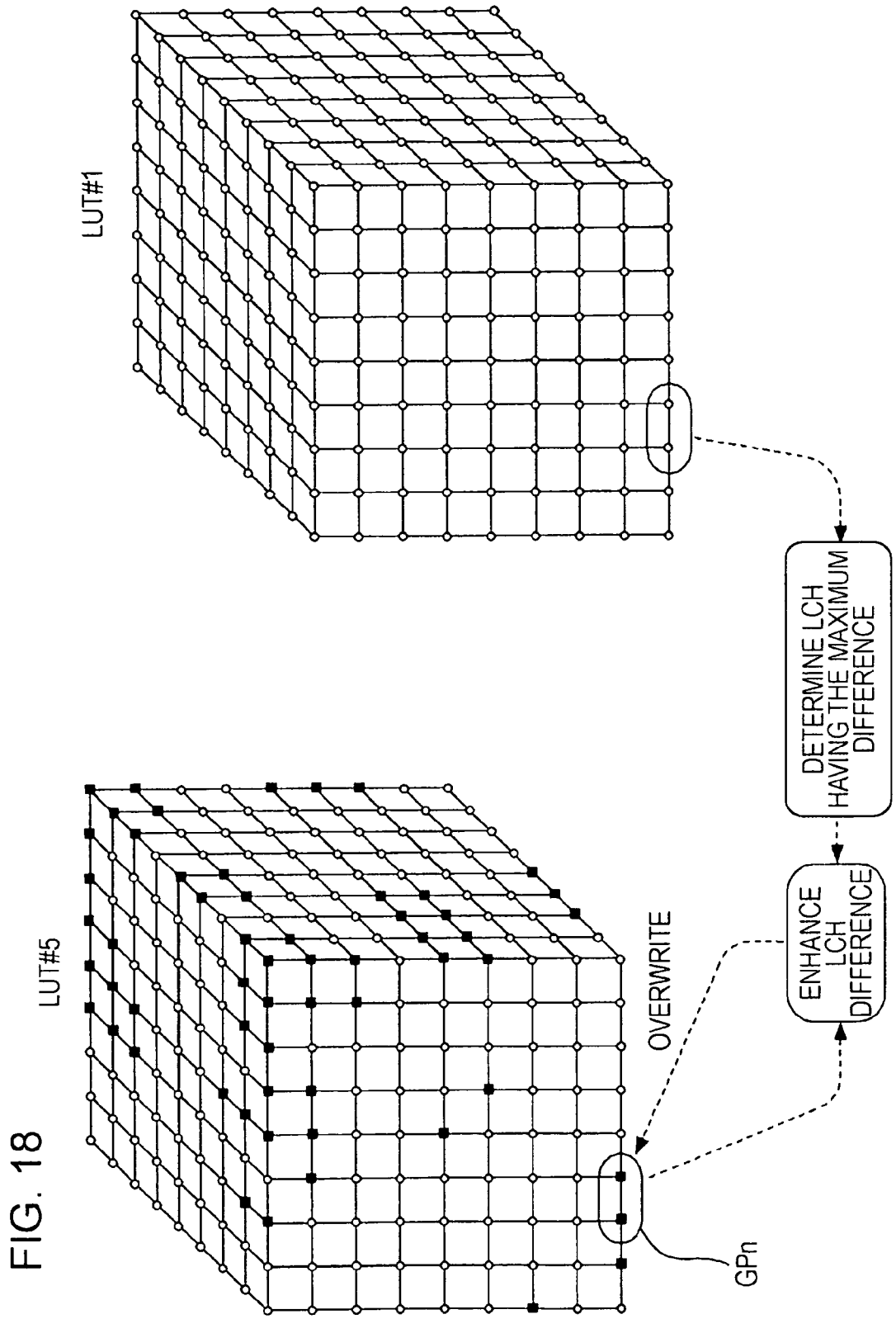

FIG. 19A

2D LUT OF D VALUE CREATING DIFFERENCE OF 1 IN R

| i | ΔL | Δa | Δb | ΔC | ΔH |
|---|----|----|----|----|----|
| 0 | | | | | |
| ... | ... | ... | ... | ... | ... |
| 255 | | | | | |

LUT−i

FIG. 19B

2D LUT OF D VALUE CREATING DIFFERENCE OF 1 IN G

| i | ΔL | Δa | Δb | ΔC | ΔH |
|---|----|----|----|----|----|
| 0 | | | | | |
| ... | ... | ... | ... | ... | ... |
| 255 | | | | | |

LUT−ii

FIG. 19C

2D LUT OF D VALUE CREATING DIFFERENCE OF 1 IN B

| i | ΔL | Δa | Δb | ΔC | ΔH |
|---|----|----|----|----|----|
| 0 | | | | | |
| ... | ... | ... | ... | ... | ... |
| 255 | | | | | |

LUT−iii

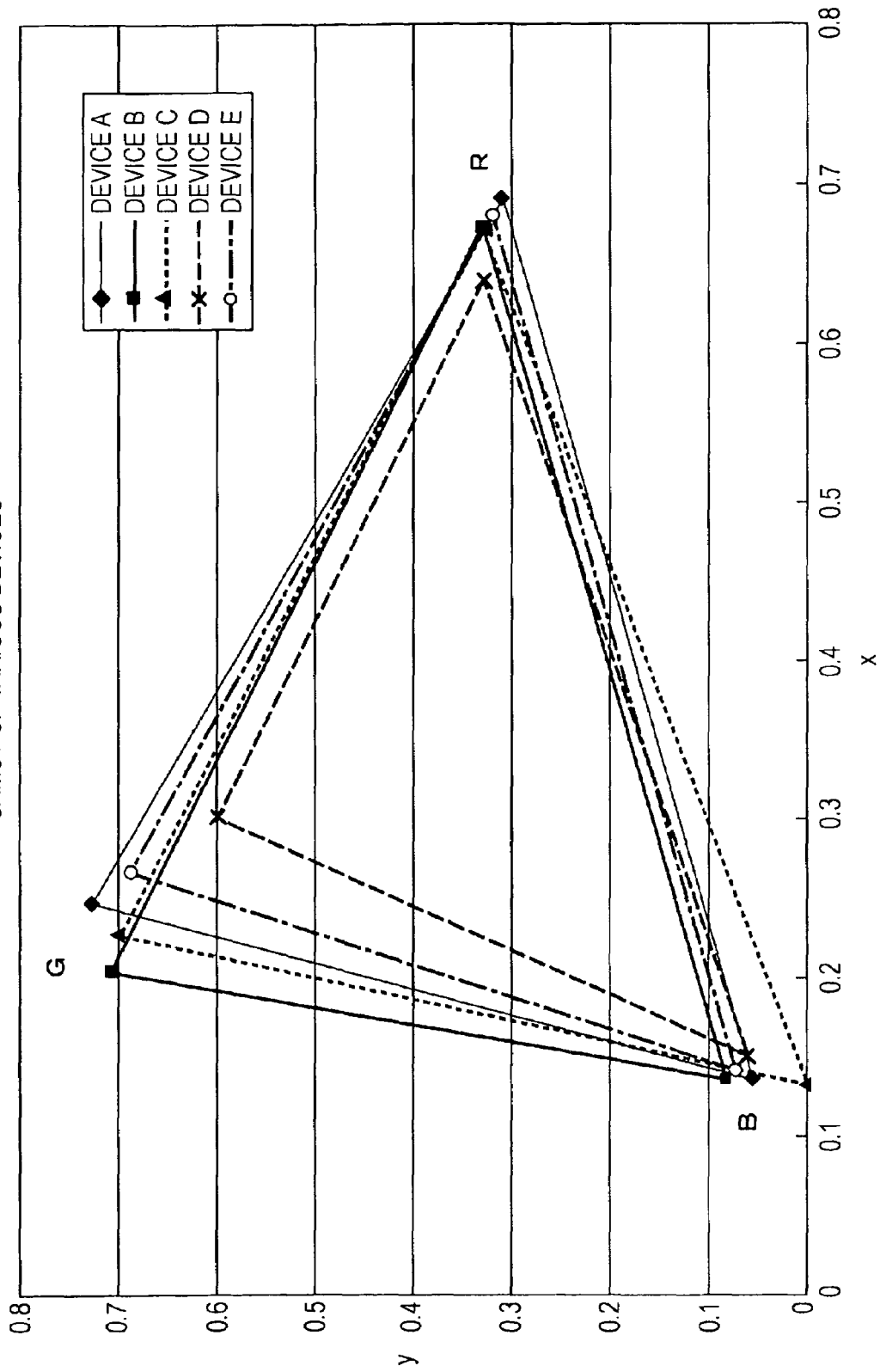

US 7,697,165 B2

GAMUT COMPRESSION METHOD, PROGRAM, AND GAMUT COMPRESSION DEVICE

CROSS REFERENCES TO RELATED APPLICATIONS

The present invention contains subject matter related to Japanese Patent Application JP 2005-260699 filed in the Japanese Patent Office on Sep. 8, 2005, the entire contents of which are incorporated herein by reference.

BACKGROUND OF THE INVENTION

1. Field of the Invention

The present invention relates to a gamut compression method, a gamut compression device, and a program for performing appropriate color reproduction between different types of devices or between different types of media for use in a color management system.

2. Description of the Related Art

To reproduce color among different types of devices and different types of media, a difference in gamut between input and output devices needs to be corrected. The technique for this process is referred to as a color gamut compression. For example, there are a variety of types of display output devices including a cathode ray tube (CRT), a projector, and a liquid-crystal panel. The projectors include various subtypes such as DLP projector and SXRD projector, and the liquid-crystal panels include a subtype such as LED backlight panel. These types have different color gamuts thereof.

For example, FIG. 20 illustrates difference in the color gamut of a variety of display output devices, device A through device E, as XYZ color diagrams.

The reproducible color gamut is different from device to device. When a video signal is displayed on a given display output device, the video signal needs to be corrected in accordance with the display output device.

To correct difference in gamut, in widely accepted practice, signal values unique to device and media, such as R, G and B values, are converted into a device-independent display color system such as L*a*b color space standardized by Commission Internationale de l'Ecalairage (CIE), and compression is performed on the device-independent color system.

SUMMARY OF THE INVENTION

The color gamut compression is mainly divided into two major processes, namely, compression technique and clipping technique ad disclosed in the paper entitled "The Fundamentals of Gamut Mapping: A Survey", JOURNAL OF IMAGING SCIENCE AND TECHNOLOGY, Volume 45, Number 3, May/June 2001, authored by Jan Morovic and M. Ronnier Luo.

The compression technique is to compress all colors. More specifically, when a first gamut is compressed into a second gamut, color conversion is performed so that all colors contained in the first gamut are contained in the second gamut. The compression technique provides the advantages that relative color relationship remains unchanged and that gradation expression is maintained. On the other hand, the compression technique has the disadvantage that a color that can be reproduced faithfully in the second gamut on a reproduction destination device, namely, a color needing no compression is also compressed.

In contrast, in the clipping technique, colors contained in the second gamut, out of the colors contained in the first gamut, namely, colors that can be reproduced faithfully on a reproduction destination device are reproduced (without being compressed), and only ones that cannot be reproduced, namely, only ones not contained in the gamut of the reproduction destination device are compressed.

The clipping technique has the advantage that the reproducible colors are faithfully reproduced. However, the disadvantage of the clipping process is that gradation expression is not sufficient because many compressed colors outside the gamut become the same.

A technique of using a lookup table (hereinafter referred to as LUT) for deriving a color data value in the second gamut as an output value from a color data value in the first gamut as an input value is effective. The LUT created in the known clipping technique causes the output values responsive to a plurality of input values to be the same, and provides insufficient gradation.

The advantage of the clipping technique over the compression technique in the field of the color compression field is reported in the paper entitled "The Fundamentals of Gamut Mapping: A Survey", JOURNAL OF IMAGING SCIENCE AND TECHNOLOGY, Volume 45, Number 3, May/June 2001, authored by Jan Morovic and M. Ronnier Luo. If the gradation expression is maintained in the clipping technique, the clipping technique can become a very effective gamut compression technique.

It is thus desirable to provide an effective gamut compression technique that maintains gradation expression while performing the gamut compression in the clipping technique.

In accordance with one embodiment of the present invention, a gamut compression method for compressing video data in a first gamut into video data in a second gamut, includes the steps of compressing a value of color data in the first gamut, not contained in the second gamut, into a value of color data contained in the second gamut through a predetermined compression calculation, and generating gradation in a manner such that a plurality of values of color data having the same value as a result of the compression in the compressing step become different in value in the second gamut.

The gradation generating step may include modifying the plurality of pieces of color data having the same value to be different in value by enhancing one of a color component and a color attribute having a maximum difference in the state thereof prior to the compressing step so that the maximum difference is enlarged.

The gradation generating step may include modifying the plurality of pieces of color data having the same value in value in the state thereof prior to the compressing step, and the compressing step may be repeated with the modified color data so that the values of the color data become different subsequent to the compressing step.

The gradation generating step may include modifying the plurality of pieces of color data having the same value in value subsequent to the compressing step so that the values of the color data become different.

The gamut compression method may further includes compressing the video data in the first gamut into the video data in the second gamut by referencing a lookup table that represents mapping between the color data value in the first gamut and the color data value in the second gamut, the lookup table obtained through the compressing step and the gradation generating step.

In accordance with another embodiment of the present invention, a program for causing an image processing apparatus to perform the steps of compressing a value of color data in the first gamut, not contained in the second gamut, into a value of color data contained in the second gamut through a predetermined compression calculation, and generating gradation in a manner such that a plurality of values of color data having the same value as a result of the compression in the compressing step become different in value in the second gamut.

The gradation generating step may include modifying the plurality of pieces of color data having the same value to be different in value by enhancing one of a color component and a color attribute having a maximum difference in the state thereof prior to the compressing step so that the maximum difference is enlarged.

The program may cause the image processing apparatus to perform a table generating step of generating a lookup table that represents mapping between the color data value in the first gamut and the color data value in the second gamut, the lookup table obtained through the compressing step and the gradation generating step.

In accordance with another embodiment of the present invention, a gamut compressing device for compressing input video data in a first gamut into a second gamut to obtain output data includes a lookup table unit for deriving a color data value in the second gamut from a color data value in the first gamut, and a color conversion unit for obtaining output image data in the second gamut by referencing the lookup table. The lookup table unit compresses a value of color data in the first gamut, not contained in the second gamut, into a value of color data contained in the second gamut through a predetermined compression calculation, and performs a gradation process to generate gradation in a manner such that a plurality of values of color data having the same value as a result of the compression in the compressing step become different in value in the second gamut. The lookup table unit thus generates table data representing mapping between the color data value in the first gamut and the color data value in the second gamut.

In the gradation generation process for generating the lookup table, the plurality of pieces of color data having the same value are set to be different in value by enhancing one of a color component and a color attribute having a maximum difference in the state thereof prior to the compressing step so that the maximum difference is enlarged. The gamut compression technique of one embodiment of the present invention is based on the clipping technique for compressing the value of color data in the first gamut, not contained in the second gamut, into the value of color data contained in the second gamut through the predetermined compression calculation. Through the clipping technique, the compression result of the color data value is accounted for in the lookup table (LUT), and color data of an actually input vide signal is obtained by referencing the LUT.

In accordance with the clipping technique, a plurality of pieces of color data can become the same subsequent to the compression, thereby destroying gradation. To maintain gradation, the plurality of pieces of color data that have the same value subsequent to the compression are modified to be different in value in the second gamut.

If a plurality of colors are compressed into a single color in the clipping compression process, a color component or a color attribute having a maximum difference prior to the compression is enhanced to effectively express gradation.

The "color component" refers to any of the values of red (R), green (G), and blue (B). The "color attribute" refers to any of the values of a, b, C, and H. L represents lightness, C represents chroma saturation, and H represents hue. Further, a and b are the value of L*a*b* color specification system, and combination of a and b represents all hues. The a value represents the chroma saturation of magenta to green, and the b value represents the chroma saturation of yellow to blue.

In accordance with embodiments of the present invention, gradation is maintained through the gamut compression using the clipping technique. More specifically, a color that can be reproduced in the output gamut is faithfully reproduced by skipping compression, and a color outside the output gamut, even if compressed, can be expressed in gradation.

When the LUT for use in gamut compression is generated using the color compression method and program in accordance with embodiments of the present invention, all output values of the LUT can be made different. The LUT is effectively used.

BRIEF DESCRIPTION OF THE DRAWINGS

FIG. 1 illustrates a system using a gamut compression device in accordance with one embodiment of the present invention;

FIG. 13 illustrates a grouping process for generating gradation in accordance with one embodiment of the present invention;

FIG. 18 illustrates an update process to generate gradation in accordance with one embodiment of the present invention;

FIGS. 19A-19C illustrate a two-dimensional table for D value setting in accordance with one embodiment of the present invention; and FIG. 20 illustrates gamuts of a variety of devices.

DESCRIPTION OF THE PREFERRED EMBODIMENTS

Figure 2A:
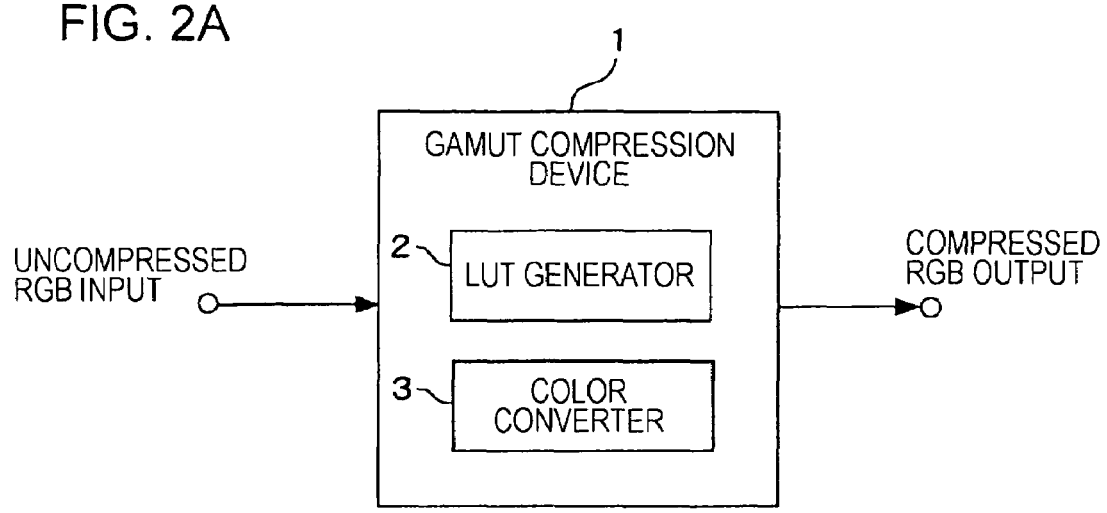
FIGS. 2A and 2B illustrate the gamut compression device of one embodiment of the present invention.

FIG. 1 shows a video editing system performing gamut compression. The video editing system of FIG. 1 edits a video from a variety of sources, outputs the edited video to a predetermined output device and creates media. Each of color management systems (CMS's) 57, 59, 62, 63, 64, and 65 includes a gamut compression device 1 or 31 to be discussed later, and performs predetermined gamut compression.

Video sources 51 through 54 of FIG. 1 represent one of a variety of devices serving as video signal sources. For example, the video sources 51 through 54 may be one of a digital camera, a film scanner, a computer graphics device, and a telecine device. Digital video data obtained through the video sources 51 through 54 may be supplied directly to an editing system 56 or via a media/server system 55 to the editing system 56.

To cause a monitor 58 to display the video data stored on the media/server system 55, the video data is gamut compressed by CMS 57 and then supplied to the monitor 58. In this case, gamut compression is performed in a manner such that the video of in the gamut unique to each of the video sources 52, 53 and 54 matches a gamut of the monitor 58.

The editing system 56 performs a variety of editing processes on the video data supplied from a video source and stores the editing results onto a master medium. For example, a data stream is created as a video content through an editing process. Master media of the video content are thus created.

A monitor 60 monitors video at each point of time in a pre-editing phase, in the middle of editing, and a post-editing phase in the editing system 56. The CMS 59 performs the gamut compression, thereby converting the video data used in the editing system 56 into video data in a gamut reproducible on the monitor 60, and providing the monitor 60 with the converted video data.

The video data stored on master media 61 may be output from a variety of output devices or stored on a variety of media.

Each of output devices 66 and 67 may be one of a projector, a LCD display device, a film recorder, and a television device. The output devices 66 and 67 may be not only a moving image display device and a recording device but also a printer device.

Each of media 68 and 69 may one of package medium, such as digital versatile disk (DVD) and a blu-ray disk, a tape medium, a hard disk drive (HDD), and a solid-state memory medium.

When the video data stored on the master media 61 is output to the output devices 66 and 67 for display or printing, the CMS 62 and the CMS 63 may perform the gamut conversion in accordance with the output devices 66 and 67.

When the video data recorded on the master media 61 is recorded onto the media 68 and 69, the CMS's 64 and 65 perform gamut compression.

With the gamut compression performed by the system of FIG. 1 in this way, color reproduction appropriate for each monitor or output device is performed. Video data is recorded in an appropriate color reproduction state. Particularly, when gamut compression is performed in response to each of the output devices 66 and 67 and the media 68 and 69, a single master medium 61 provides video data matching the gamut of each output device.

Figure 2B:
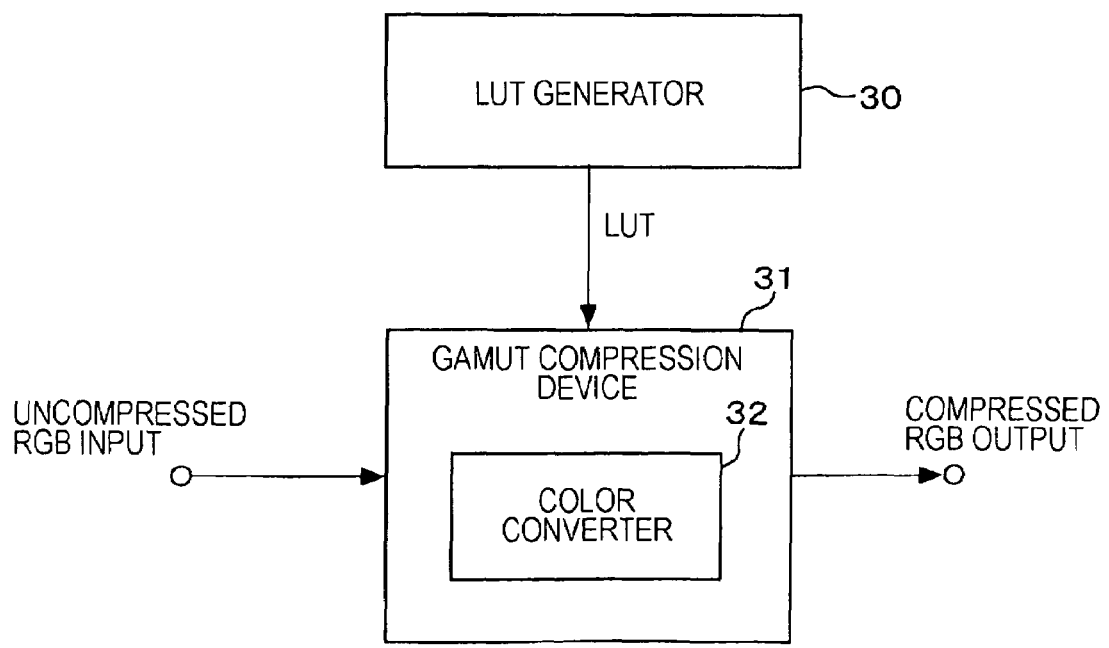

FIGS. 2A and 2B generally illustrate a gamut compression devices 1 and 31 of one embodiment of the present invention. The gamut compression device 1 of FIG. 2A includes a LUT generator 2 for generating a three-dimensional (3D) LUT to be discussed later for gamut compression process, and a color converter 3 for converting an RGB signal value as an input video signal into an output RGB signal value using the LUT.

The gamut compression device 1 of FIG. 2A may be employed for each of the CMS's 57, 59, 62, 63, 64, and 65 shown in FIG. 1.

As shown in FIG. 2B, a LUT generator 30 generates a LUT for gamut compression process. The generated LUT is supplied to the gamut compression device 31. The gamut compression device 31 includes a color converter 32 for converting an RGB signal value as an input video signal into an output RGB signal value using the LUT. The color converter 32 stores the LUT generated by the LUT generator 30 and performs color conversion by referencing the LUT.

The LUT generator 30, external to the gamut compression device 31, may be a general-purpose image processing apparatus generating the LUT in accordance with a LUT generating program or a dedicated apparatus generating the LUT for gamut compression. The generated LUT may be transmitted to the gamut compression device 31 in a communication process. The LUT generator 30 and the gamut compression device 31 can communicate with each other using wired or wireless communication. The generated LUT generated by the LUT generator 30 is stored onto a predetermined recording medium, and then transferred to the gamut compression device 31 via the recording medium.

For example, each of the CMS's 57, 69, 62, 63, 64, and 65 of FIG. 1 may include only the gamut compression device 31 of FIG. 2B or a combination of the gamut compression device 31 and the LUT generator 30.

In each case of FIGS. 2A and 2B, the gamut compression device 1 (gamut compression device 31) includes the color converter 3 (color converter 32) for acquiring the LUT that derives the color data value in the second gamut from the color data value in the first gamut and outputting video data in the second gamut in response to input video data in the first gamut by referencing the LUT.

The LUT maps the color data in the first gamut to the color data in the second gamut when the value of color data in the first gamut, not contained in the second gamut, is converted into the color data value contained in the second gamut through predetermined compression calculation in the clipping process. A plurality of pieces of color data having the same value subsequent to the compression are made different in the second gamut through gradation process. The LUT includes table data that maps the first color data value in the first gamut to the color data value in the second gamut.

With the LUT generated by the LUT generator 2 or the LUT generator 30, each of the color converters 3 and 32 simply references the LUT in response to input RGB data for output RGB data. In this way, the gamut compression is performed using the clipping technique with gradation maintained.

The structure of the gamut compression device 1 is described below with reference to FIG. 2A.

The gamut compression device 1 includes an arithmetic unit 10, a gamut database 11, a memory 12, an input unit 14, and an output unit 15.

The arithmetic unit 10 performs an arithmetic process as the LUT generator 2 and the color converter 3 of FIG. 2A.

The gamut database 11 stores information concerning the gamut of each device.

The memory 12 is composed of memory areas such as of a read-only memory (ROM), a random-access memory (RAM), and a non-volatile memory. The ROM area stores programs and process coefficients of the arithmetic process of the arithmetic unit 10. The programs include a program of a LUT generation process defining a process operation of the LUT generator 2, and a program of a color conversion process using the LUT defining the process of the color converter 3. The RAM area in the memory 12 serves as a working area for the arithmetic process. The non-volatile memory area stores the LUT generated in the process of the LUT generator 2 in the arithmetic unit 10.

The input unit 14 receives the video data to be subjected to the gamut compression. The input unit 14 transfers the RGB value of the input video data to the arithmetic unit 10.

The output unit 15 outputs the video data of the RGB value converted by the color converter 3 in the arithmetic unit 10 to an external device such as a monitor.

The LUT generator 2, the color converter 3, and a memory interface 13 in the arithmetic unit 10 are implemented using software or hardware.

The LUT generator 2 includes, as software functional blocks, a converter 21, a gamut boundary determiner 22, a gamut compressor 23, a color gradation generator 24, and a memory controller 25.

The converter 21 performs a conversion process between RGB values, Lab values, and LCH values.

L value (lightness value), value a, and value b are obtained based on the RGB values from the following equation (1):

$$\begin{bmatrix} X \\ Y \\ Z \end{bmatrix} = [M] \begin{bmatrix} R \\ G \\ B \end{bmatrix} \quad \text{Equation (1)}$$

$$L = 116(Y/Yn)^{1/3} - 16$$

$$a = 500\left\{(X/Xn)^{1/3} - (Y/Yn)^{1/3}\right\}$$

$$b = 200\left\{(Y/Yn)^{1/3} - (Z/Zn)^{1/3}\right\}$$

where Xn, Yn, and Zn are tristimulus values of a light source, and (Xn, Yn, Zn)=(95.04, 100.00, 108.89) in the case of standard illuminant $D_{65}$.

C value (chroma saturation), and H value (hue) in the LCH are determined from the a value and the b value using the following equation (2):

$$C = \sqrt{a^2 + b^2}$$

$$H = \arctan(b/a) \quad \text{Equation (2)}$$

In the process of the LUT generator 2, the RGB value is converted into the LCH value, and the LCH value is converted into the RGB value. In accordance with equations (1) and (2), the RGB values are converted into the LCH values via the Lab values. Conversely, the LCH values are converted into the RGB values through inverse operation.

In the LUT generation process to be discussed later, the gamut boundary determiner 22 converts input RGB values in an input gamut into LCH values, converts the LCH values into output RGB values, and then determines whether the output RGB values fall within an output gamut.

The gamut compressor 23 performs a compression operation in a predetermined arithmetic process on the output RGB values that the gamut boundary determiner 22 has determined to be outside the output gamut so that the output RGB values fall within the output gamut. In one example, an operation of $\Delta E_{94}$ color difference equation defined by CIE, as represented by equation (3) is performed.

$$\Delta E_{94}^* = \sqrt{\left(\frac{\Delta L^*}{k_L \cdot S_L}\right)^2 + \left(\frac{\Delta C_{ab}^*}{k_C \cdot S_C}\right)^2 + \left(\frac{\Delta H_{ab}^*}{k_H \cdot S_H}\right)^2} \quad \text{Equation (3)}$$

$$S_L = 1$$

$$S_C = 1 + 0.045 \times \sqrt{C_{ab,1}^* \cdot C_{ab,2}^*}$$

$$S_H = 1 + 0.015 \times \sqrt{C_{ab,1}^* \cdot C_{ab,2}^*}$$

Instead of equation (3), another color difference equation, such as equation (4), may also be acceptable:

$$\Delta E^* = \sqrt{(\Delta L^*)^2 + (\Delta a^*)^2 + (\Delta b^*)^2} \quad \text{Equation (4)}$$

The color gradation generator 24 processes a plurality of pieces of color data becoming the same in value subsequent to the compression of the gamut compressor 23 so that the plurality of pieces of color data become different in value in the output gamut. The gamut boundary determiner 22 measures the boundary of the output gamut for each of the RGB values and the gamut compressor 23 compresses the RGB values determined to be outside the output gamut. This operation means the gamut compression in the clipping technique. A plurality of RGB values that have undergone the compression operation may happen to be the same or a compressed RGB value and an uncompressed RGB value (in other words, an RGB value determined to be within the output gamut) may happen to be the same. The color gradation generator 24 modify the output RGB values happening to be same into different values in order to maintain gradation.

The memory controller 25 reserves a memory area in the memory 12 for the LUT generation process, generates an LUT skeleton, and overwrites data.

The LUT generator 2 thus constructed accesses one of the gamut database 11 and the memory 12 via the memory interface 13.

The color converter 3 captures, via the memory interface 13, the LUT generated in the process of the LUT generator 2. The color converter 3 converts input RGB values supplied by the input unit 14 into the output RGB values by referencing the LUT, and supplies the output RGB values to the output unit 15.

The gamut compression process executed by the gamut compression device 1 thus constructed is described below.

An image created to be reproduced on a projector device might be reproduced on a CRT. The gamut of the projector device is typically wider than the gamut of the CRT generally defined in SRGB or ITU-R709.

The gamut of the projector device is the first gamut, namely, the input gamut in the gamut compression process. The gamut of the CRT is the second gamut, namely, the output gamut in the color compression process.

When the gamut compression is performed so that the image created to be reproduced on the projector device may be actually reproduced on the CRT, a reproducible color contained in the input gamut (gamut of the projector device) but not contained in the output gamut (gamut of the CRT) is compressed so that that color is reproducible on the CRT.

In the flow of gamut compression process, a color reproducible in the input gamut is mapped to device-independent CIELAB color space. A color mapped outside the CRT gamut in the device-independent CIELAB color space is compressed into a color within the CRT gamut.

The operation of one of the color difference equations (3) and (4) is performed as the compression process. To compress a color providing a minimum color difference, the use of a color difference equation taking into consideration non-linearity in the CIELAB color space, such as equation (4) as the $\Delta E_{94}$ color difference equation, is effective.

A plurality of colors may be compressed into the same color. Since these colors are shown as the same color on a reproduction device (such as the CRT), gradation disappears. To overcome this drawback, the present embodiment modifies the color data so that a color component or attribute, having a maximum difference, prior to the compression is enhanced.

The color component refers to one of the R, G, or B values, and the attribute refers to one of L, C and H values as three attributes of the human vision.

The concept of this embodiment is described below with reference to FIG. 4.

Figure 4:
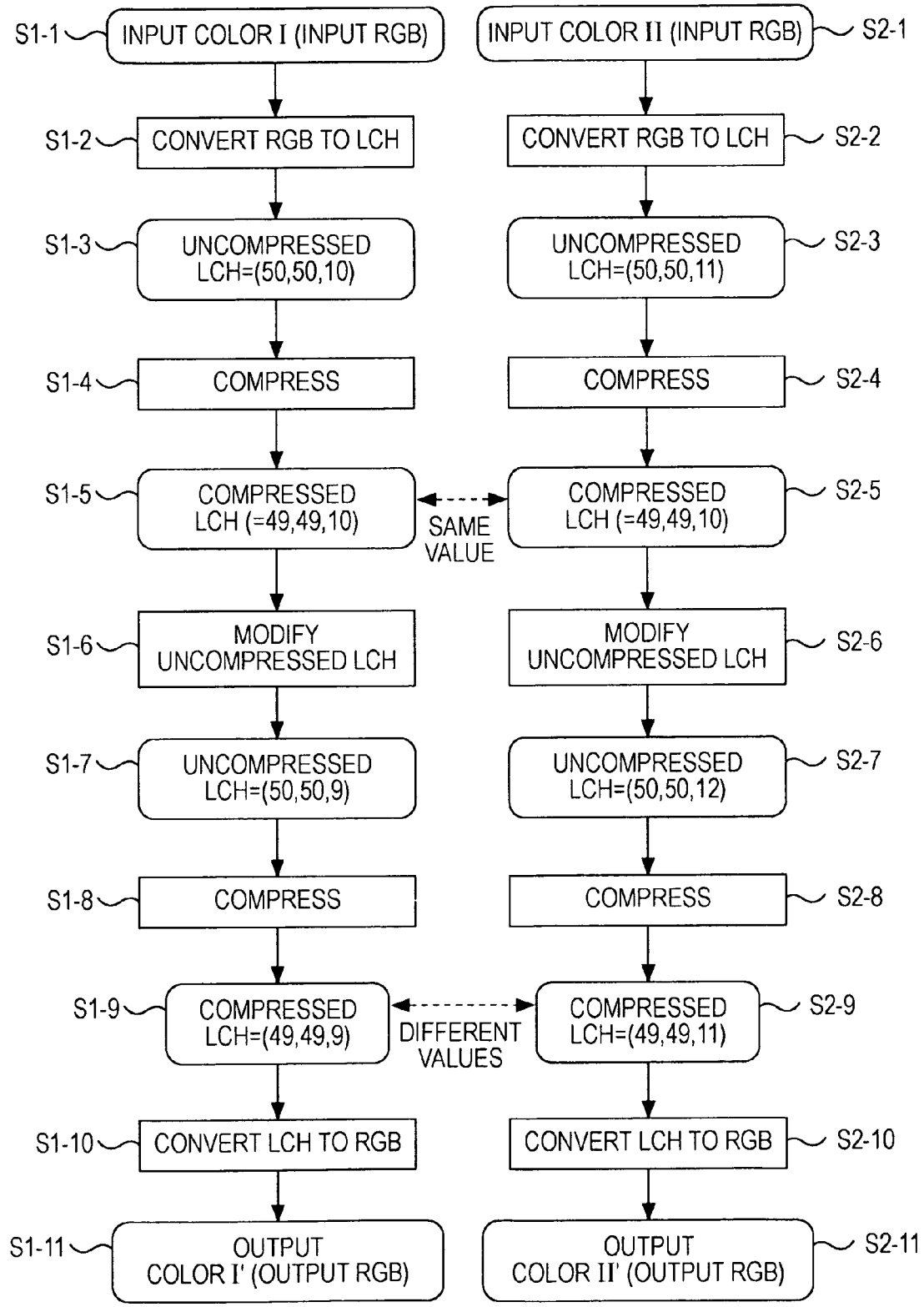
FIG. 4 illustrates a first gamut compression process of one embodiment of the present invention.

As shown in FIG. 4, the input RGB values are two colors I and II contained in the input gamut. The colors I and II are compressed into colors I' and II' contained in the output gamut. As shown in FIG. 4, steps S1-1 through S1-11 refer to the flow of compression process for the color I, and steps S2-1 through S2-11 refer to the flow of compression process for the color II.

Each of the colors I and II in the input gamut is acquired as a target to be compressed into the output gamut (steps S1-1 and S2-1)

The color I as the RGB values is converted into the LCH values (step S1-2). The color II as the RGB values is converted into the LCH values (step S2-2).

As a result of converting the color I into the LCH values, the L value, the C value, and the H value are 50, 50, and 10, respectively (step S1-3). As a result of converting the color II into the LCH values, the L value, the C value, and the H value are 50, 50, and 11, respectively (step S2-3).

The LCH values of each of the colors I and II are compressed in accordance with the above equation (3) (step S1-4 and S2-4).

As a result of compression operation, the L value, the C value, and the H value of the color I are 49, 49, and 10, respectively (step S1-5). As a result of compression operation, the L value, the C value, and the H value of the color II are 49, 49, and 10, respectively (step S2-5). More specifically, the compression of the colors I and II into the output gamut results in the same color in the output gamut. This means that gradation disappears in the output gamut.

A process to gain gradation now starts. The LCH values prior to the compression (steps S1-3 and S2-3) are recognized to detect, from among the other attributes, attributes that cause the largest difference and the LCH values prior to compression are modified to enhance the distribute difference (steps S1-6 and S2-6).

Since the largest difference is found in the H value from among the LCH values prior to compression (the values in steps S1-3 and S2-3), the uncompressed LCH values are modified to enhance the H value difference. As a result, the uncompressed LCH values of the color I are modified to be 50, 50, and 9 (step S1-7), and the uncompressed LCH values of the color II are modified to be 50, 50, and 12 (step S2-7).

The LCH values of the modified colors I and II are compressed again (steps S1-8 and S2-8).

As a result of compression operation, the L value, the C value and the H value of the color I become 49, 49, and 9, respectively (step S1-9), and the L value, the C value and the H value of the color II become 49, 49, and 11, respectively (step S2-9). More specifically, the colors I and II are compressed into different colors in the output gamut. This means that the color gradation of the colors I and II is maintained in the output gamut.

The compressed LCH values of the color I and the color II are converted to respective RGB values (steps S1-10 and S2-10).

The converted RGB values are output RGB values, namely, the color I' and the color II' obtained as a result of compression process (steps S1-11 and S2-11).

The compression process is performed with the RGB values converted into the LCH values herein. Alternatively, the compression process may be performed on Lab values. The color attribute difference is enhanced as the LCH values. Alternatively, a difference in the Lab values may be enhanced or a difference in the color component (RGB values) may be enhanced. It is important that the output RGB values of the colors I' and II' be different.

As understood from the color I and the color II of FIG. 4, the gamut compression process of the present embodiment is based on the concept that a plurality of pieces of color data in the input gamut becoming the same in value subsequent to compression are set to be different with the color component or the color attribute providing the largest difference, from among the color components or the color attributes prior to compression, being enhanced.

To make the plurality of pieces of color data different in value, the compression process is performed on the plurality of color data having the same value with the uncompressed value thereof modified. The compressed color data values become different.

A specific example of the gamut compression process based on the concept is described below.

Figure 3:
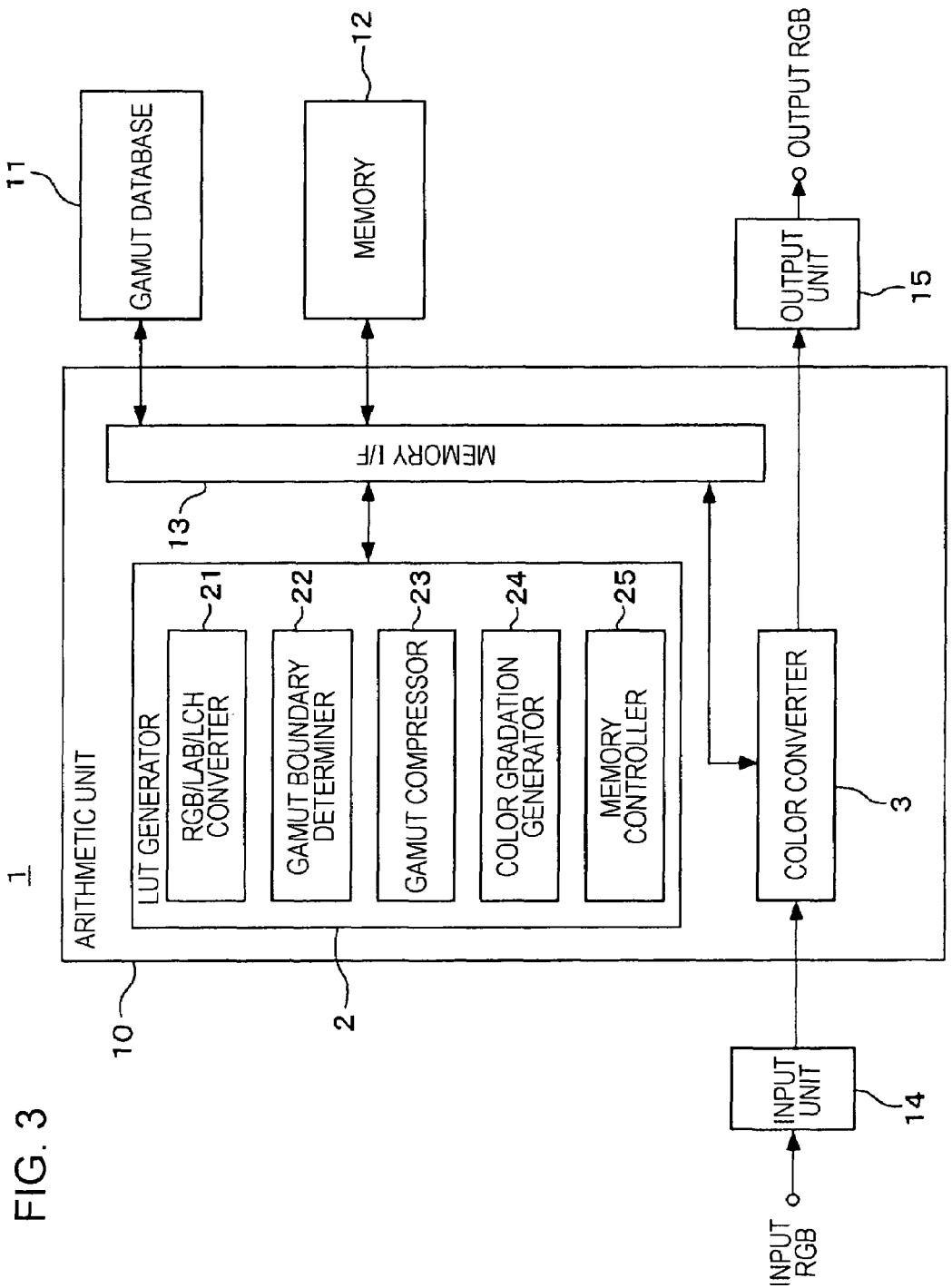
FIG. 3 is a block diagram of the gamut compression device of one embodiment of the present invention.
Figure 5:
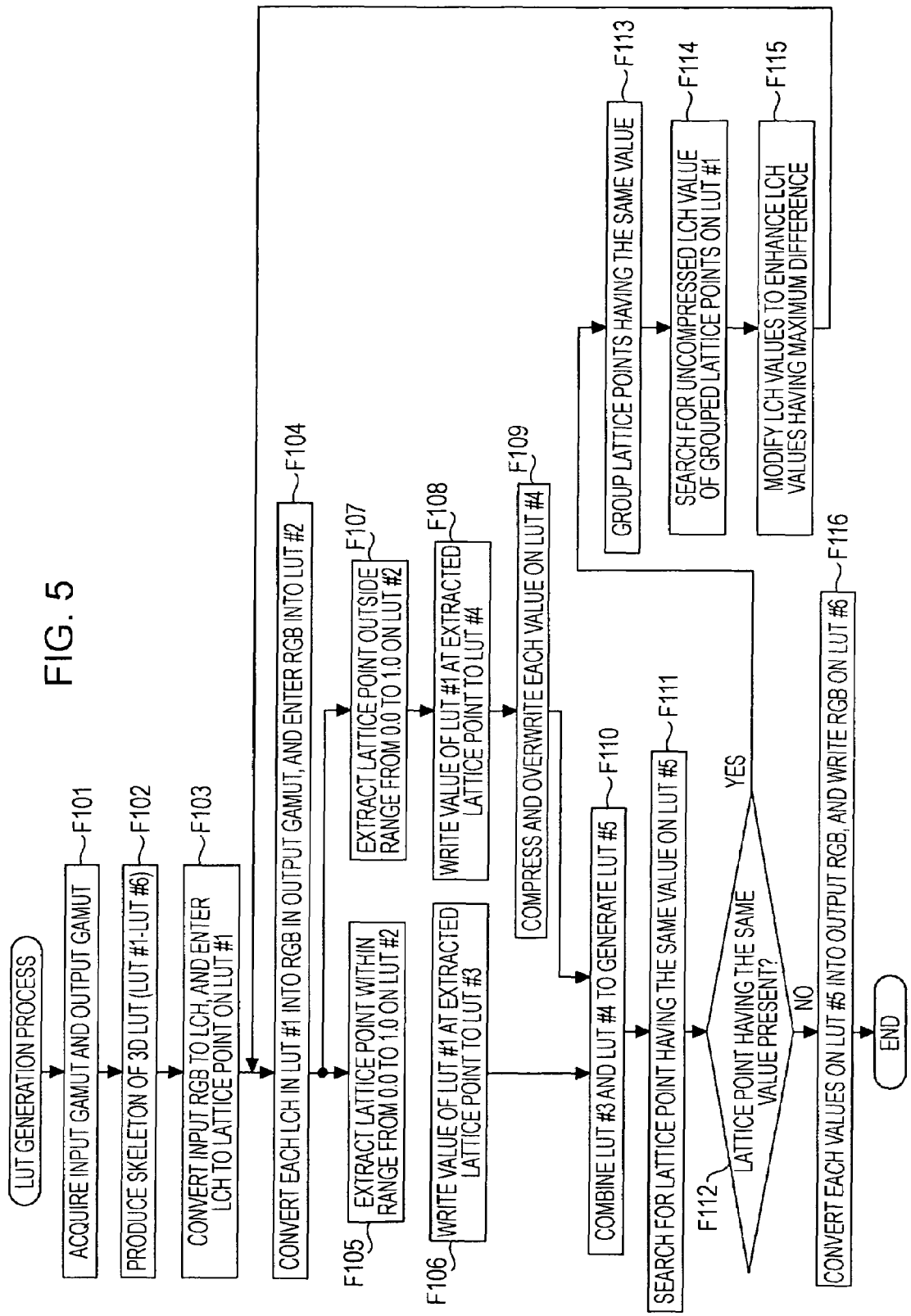
FIG. 5 is a flowchart of a LUT generation process to perform the first gamut compression process in accordance with one embodiment of the present invention.

FIG. 5 illustrates a LUT generation process executed by the LUT generator 2 of FIG. 3 (or the LUT generator 30 of FIG. 2B). The color converter 3 (color converter 32 of FIG. 2B) converts the input RGB values into the output RGB values using the LUT generated in the LUT generation process. The above-referenced gamut compression process is thus performed.

The process to be executed by the LUT generator 2 is described below with reference to FIG. 5. Steps F101 through F116 of FIG. 5 are performed by the LUT generator 2. Individual steps are performed using internal functions of the LUT generator 2 as below.

Steps F101 and F102 are performed by the memory controller 25 in the memory access function thereof.

Steps F103, F104, and F116 are performed by the converter 21 in the conversion function thereof and by the memory controller 25 in the memory access function thereof.

Steps F105, F106, F107, and F108 are performed by the gamut boundary determiner 22 in the determination function thereof and by the memory controller 25 in the memory access function thereof.

Step F109 is performed by the gamut compressor 23 in the compression calculation function thereof and by the memory controller 25 in the memory access function thereof.

Steps F110, F111, F112, F113, F114, and F115 are performed by the color gradation generator 24 in the gradation generation function thereof and by the memory controller 25 in the memory access function thereof.

In the process of FIG. 5, the LUT generator 2 acquires data in the input gamut and data in the output gamut from the gamut database 11 in step F101. For example, the LUT generator 2 acquires the gamut of a projector device as the input gamut, and as the output gamut the gamut of a CRT, for example, the gamut of the ITU-R709 standard.

Figure 6:
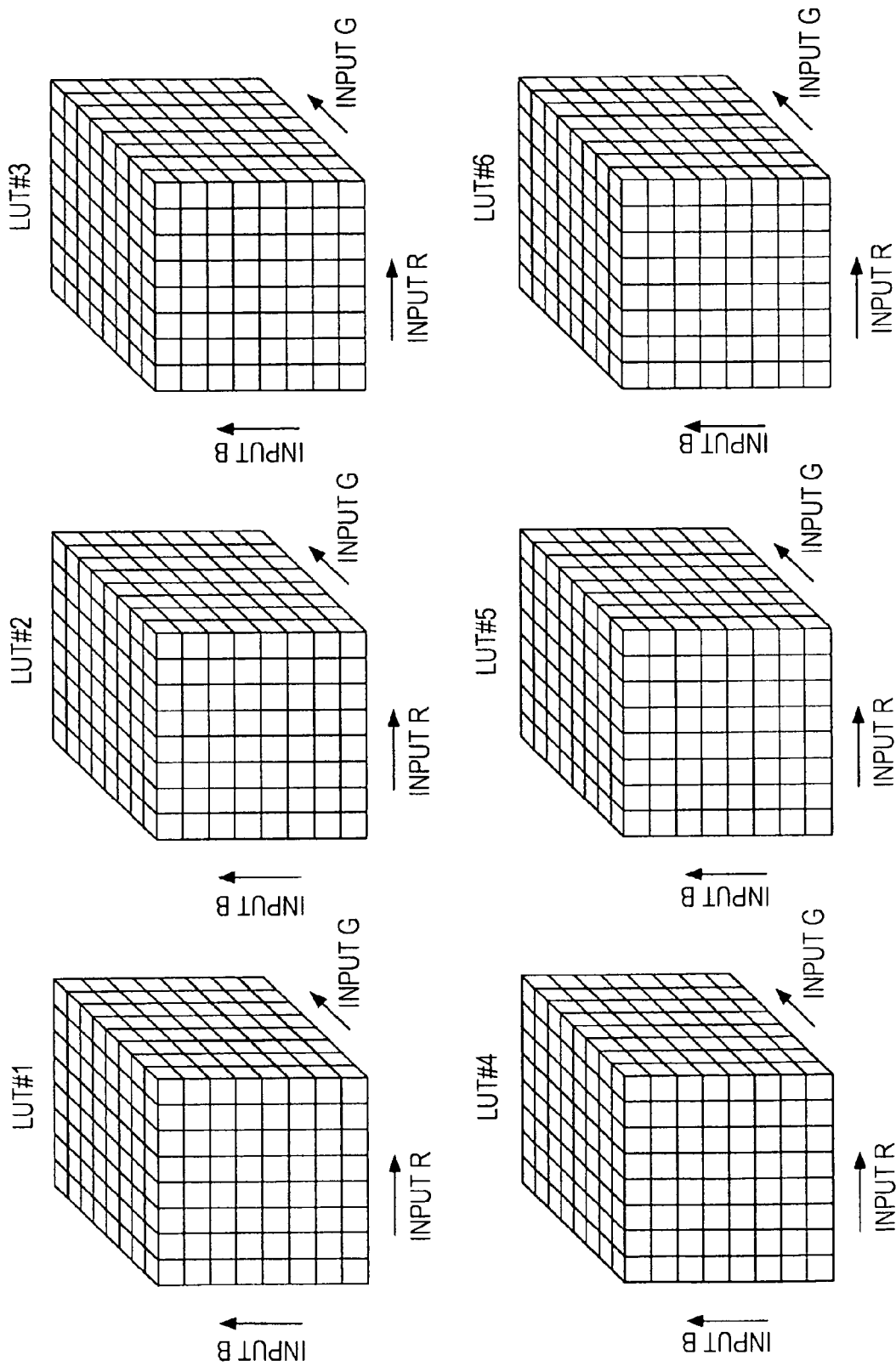
FIG. 6 illustrates LUT skeleton generation in accordance with one embodiment of the present invention.

The LUT generator 2 then creates a skeleton of a three-dimensional LUT (hereinafter referred to as 3DLUT) in the RAM area of the memory 12 in step F102. The LUT generator 2 determines the number of segments as the 3DLUT while six 3DLUTs having the same skeleton, namely, LUT #1, . . . , LUT #6 as shown in FIG. 6. Each 3DLUT corresponds to the RGB values of the input gamut. The three-dimensional LUT has axes as an input R value, an input G value, and an input B value.

The number of segments of the 3DLUT may be determined dependent on the system, for example, may be 9×9×9, 17×17×17, 33×33×33, or the like. FIG. 6 illustrates a 3DLUT skeleton of 9×9×9. Each lattice point represents an input point of table data. The 3DLUT has 9 lattice points for each of the input R value, the input G value, and the input B value, namely, a total of 729 lattice points.

In step F103, the LUT generator 2 converts all RGB values (input RGB values) in the input gamut into LCH values, and enters the LCH values to the lattice points in the LUT #1.

Figure 7:
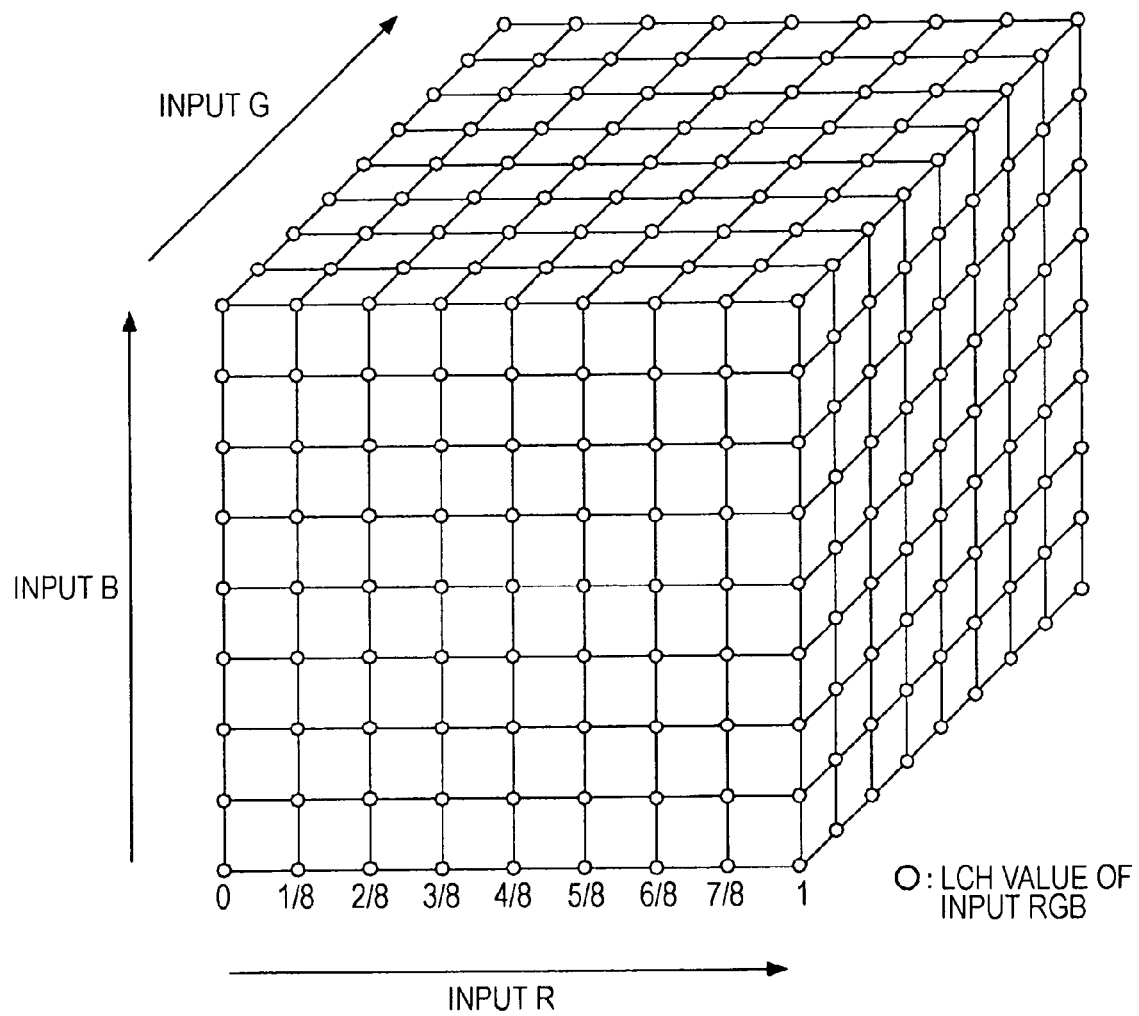
FIG. 7 illustrates an LCH value input to LUT #1 in accordance with one embodiment of the present invention.

FIG. 7 illustrates small blank circles that indicate the lattice points of the LUT #1 that have received the LCH values in response to the input RGB values.

Figure 8:
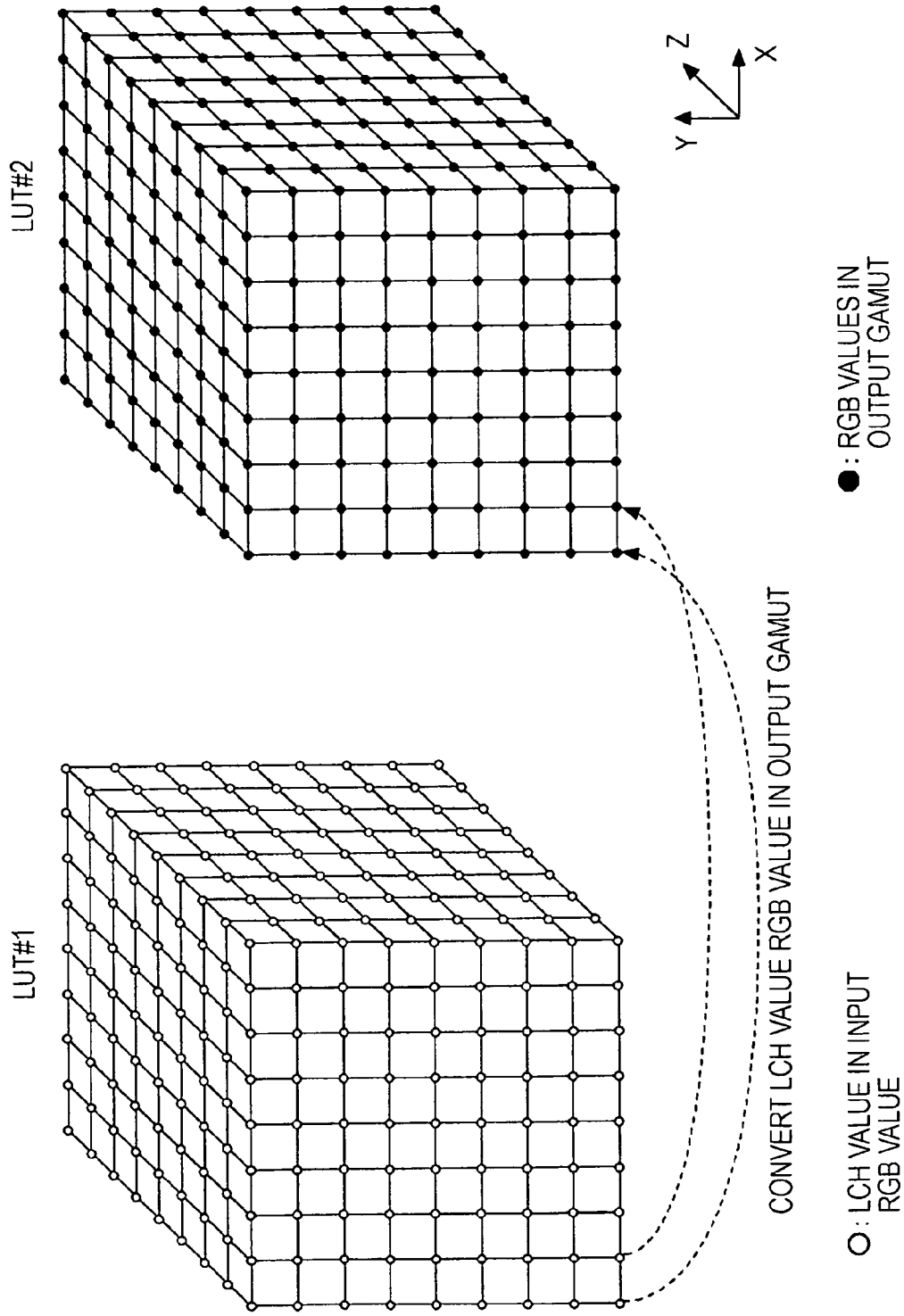
FIG. 8 illustrates an RGB value input to LUT #2 in accordance with one embodiment of the present invention.

In step F104, the LCH values at the lattice points of the LUT #1 are converted into the RGB values in the output gamut, and the RGB values in the output gamut are input to lattice points of the LUT #2. As shown in FIG. 8, the LCH values at the lattice points represented by the small blank circles are converted into the RGB values in the output gamut and the RGB values in the output gamut are input to the lattice points represented by respective small solid black circles on the LUT #2.

The LUT generator 2 performs processes in steps F105 and F107 in parallel. More specifically, in step F105, the LUT generator 2 extracts a lattice point having the RGB value thereof falling within the range of the output gamut in connection with the RGB values of the lattice points of the LUT #2. In step F107, the LUT generator 2 extracts a lattice point having the RGB value thereof falling outside the range of the output gamut.

If all of the R value, the G value, and the B value fall within a range of 0.0 to 1.0, those RGB values are determined as falling within the range of the output gamut. If any one of the R value, the G value, and the B value falls outside the range of 0.0 to 1.0, the RGB values are determined as falling outside the range of the output gamut.

Figures 9A, 9B, 10:
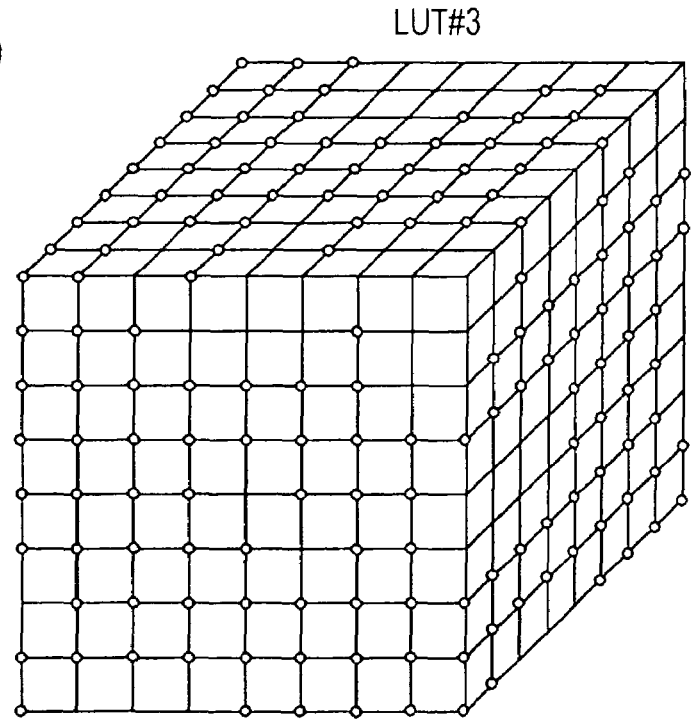
FIGS. 9A and 9B illustrate determination of the boundary of gamut in accordance with one embodiment of the present invention.
FIG. 10 illustrates LCH value input to LUT #3 in accordance with one embodiment of the present invention.

The within/outside determination of the output gamut is performed on each of the RGB values at the lattice points. As shown in FIGS. 9A and 9B, the lattice points are identified as to whether the RGB values falls within or outside the output gamut. As shown in FIGS. 9A and 9B, (x, y, z) represents a lattice point of the 3DLUT in R, G, and B axes. For example, the RGB values input to lattice points represented by (x0, y0, z0), (x0, y1, z0), . . . (xa, yb, zc) on the LUT #2 of FIG. 9A are determined as falling within the range of the output gamut. For example, the RGB values input to lattice points represented by (x1, y0, z0), (x0, y3, z1), . . . (xd, ye, zf) on the LUT #2 of FIG. 9B are determined as falling outside the range of the output gamut.

In step F105, the LUT generator 2 extracts the lattice point having the RGB values falling within the range of the output gamut as shown in FIG. 9A. In step F106, the LUT generator 2 enters, to corresponding lattice points of the LUT #3, the LCH values input to the lattice points of the LUT #1 corresponding to the extracted lattice points of the LUT #2.

As shown in FIG. 9A, the RGB values of the lattice points of the LUT #2 (x0, y0, z0), (x0, y1, z0), . . . (xa, yb, zc) fall within the range of the output gamut. The LCH values input to the lattice points of LUT #1 (x0, y0, z0), (x0, y1, z0), . . . , (xa, yb, zc) are input to the lattice positions of the LUT #3 (x0, y0, z0), (x0, y1, z0), . . . , (xa, yb, zc).

For example, the LCH values recorded on the LUT #1 are written in the lattice points of the LUT #3 corresponding to the lattice points having the RGB values falling within the range of the output gamut in the LUT #2 as represented by the small blank circles in FIG. 10. As shown in FIG. 10, a lattice point having no small blank circle means an empty lattice point having no LCH values written thereon.

In step F107, the LUT generator 2 extracts the lattice points having the RGB values falling outside the range of the output gamut as shown in FIG. 9B. In step F108, the LUT generator 2 inputs, to corresponding lattice points of the LUT #4, the LCH values input to the lattice points of the LUT #1 corresponding to the extracted lattice points of the LUT #2.

More specifically, as shown in FIG. 9B, the RGB values of the lattice points of the LUT #2 (x1, y0, z0), (x0, y3, z1), . . . (xd, ye, zf) fall outside the range of the output gamut. The LCH values input to the lattice points of LUT #1 (x1, y0, z0), (x0, y3, z1), . . . , (xd, ye, zf) are input to the lattice positions of the LUT #4 (x1, y0, z0), (x0, y3, z1), . . . , (xd, ye, zf).

Figure 11B:
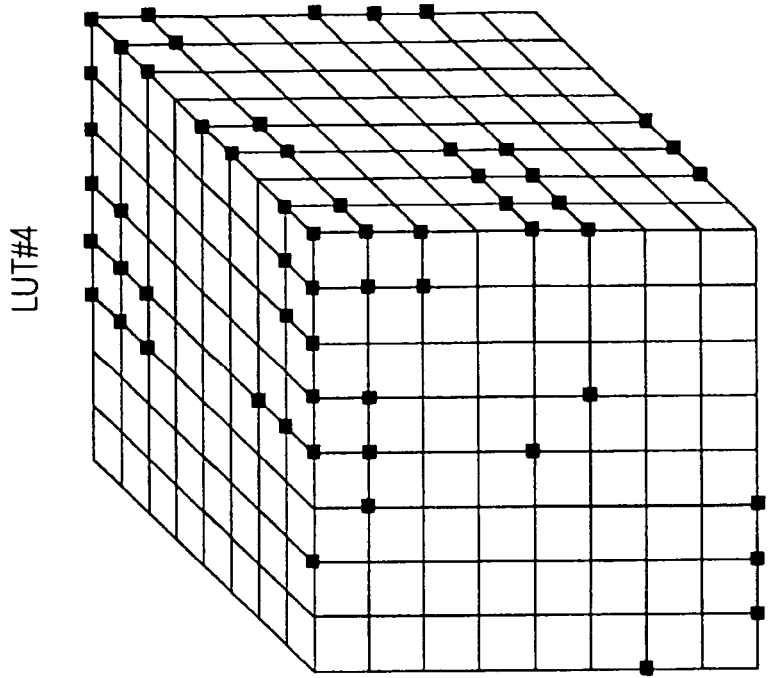
FIGS. 11A and 11B illustrate LCH value input to LUT #4 and compression in accordance with one embodiment of the present invention.
Figure 11A:
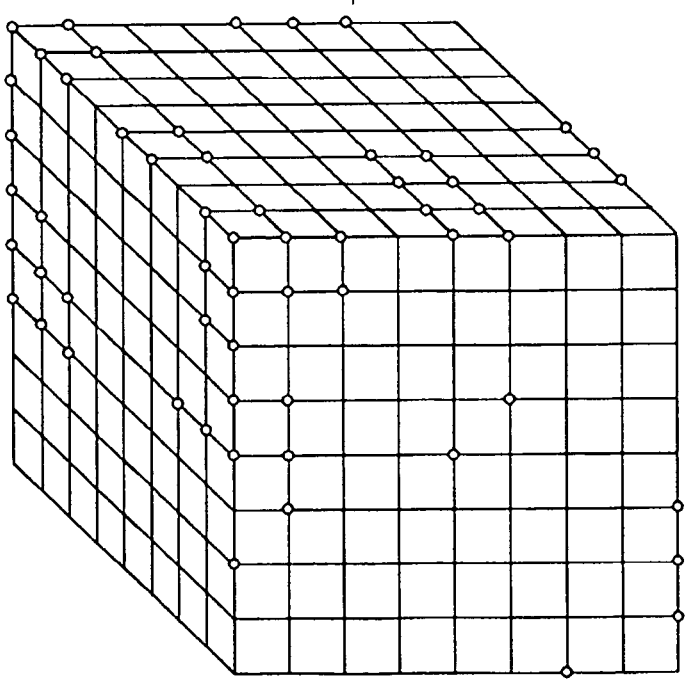

For example, the LCH values recorded on the LUT #1 are written in the lattice points of the LUT #4 corresponding to the lattice points having the RGB values falling outside the range of the output gamut in the LUT #2 as represented by the small blank circles in FIG. 11A. As shown in FIG. 11A, a lattice point having no small blank circle means an empty lattice point having no LCH values written thereon.

The lattice point represented by the small blank circle having the LCH values in the LUT #3 of FIG. 10 becomes an empty lattice point in the LUT #4 of FIG. 11A. The lattice point represented by the small blank circle having the LCH values on the LUT #4 of FIG. 11A becomes an empty lattice point in the LUT #3 of FIG. 10.

The LCH values input to the LUT #3 of FIG. 10 have the input RGB values falling within the range of the output gamut, namely, correspond to a color requiring no gamut compression in the clipping technique.

The LCH values input to the LUT #4 of FIG. 11A fall outside the range of the output gamut, and correspond to a color requiring the compression process.

In step F109, the LUT generator 2 performs compression process on the color at the lattice position input to the LUT #4 of FIG. 11A. For example, the LCH values input to the LUT #4 are compressed using the arithmetic operation represented by equation (4). The compressed LCH values overwrites on the lattice points of the LUT #4. Each solid black square of FIG. 11B represents such a compressed LCH value. In other words, the LCH values represented by the blank circles of FIG. 11A are compressed, and the compressed LCH values overwrite the uncompressed LCH values as represented by solid black square symbols in FIG. 11B.

Figure 12:
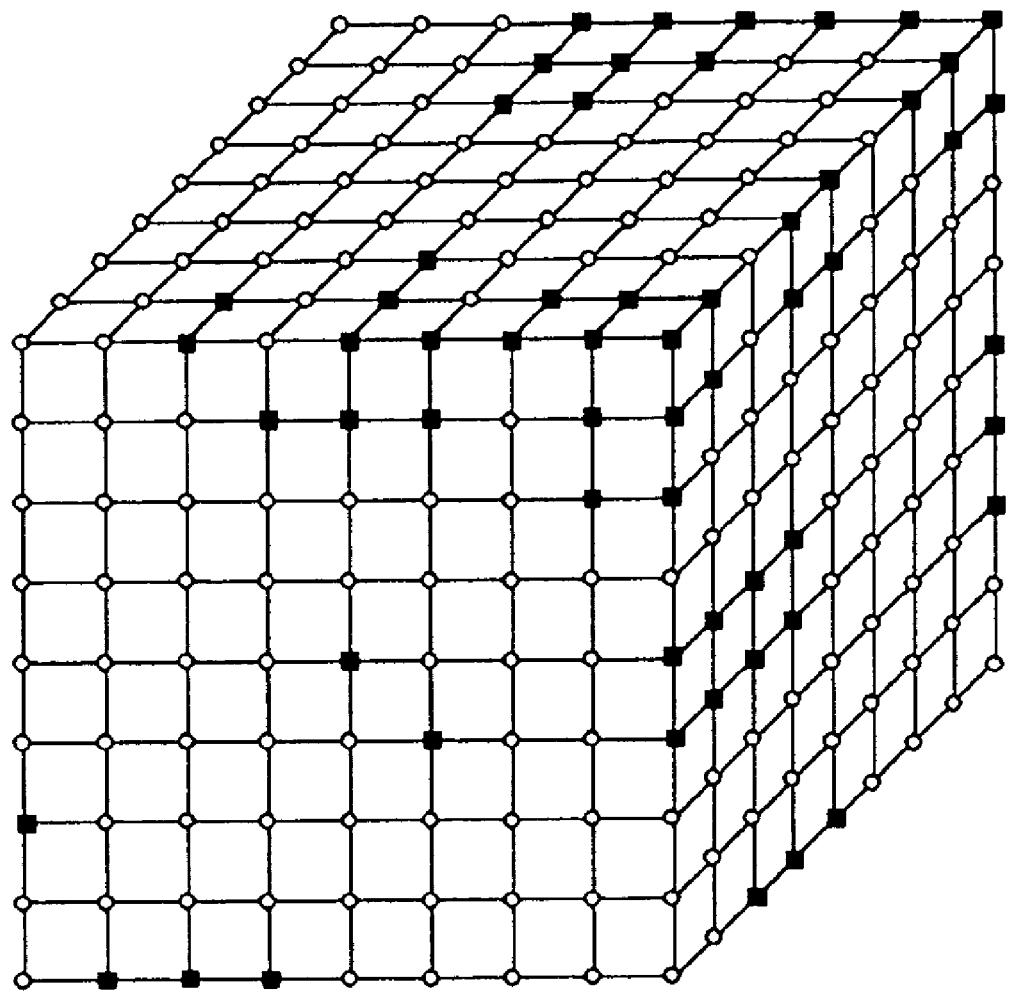
FIG. 12 illustrates generation of LUT #5 in accordance with one embodiment of the present invention.

Subsequent to steps F105 through F109, the LUT generator 2 combines the LUT #3 of FIG. 10 with the LUT #4 in the state of FIG. 11B, thereby generating the LUT #5 of FIG. 12. More specifically, the LCH values written on the LUT #3 and the LCH values written on the LUT #4 are written on the lattice points of the LUT #5. As a result, the LUT #5 contains both the LCH values having undergone no compression and the compressed LCH values.

In step F111, lattice points having the same LCH value, from among the LCH values written on the LUT #5, are searched for and then grouped.

As previously discussed, two different LCH values may become the same value as a result of compression process. Furthermore, a compressed LCH value may become equal to another uncompressed LCH value. In step F111, such LCH values equal to each other are searched for.

If lattice points having the same LCH value are found, processing proceeds from step F112 to step F113. The lattice points having the same LCH value are grouped together. FIG. 13 illustrates the search results in which the lattice points having the same LCH value on the LUT #5 are listed as GP1, GP2, . . . . For example, since the LCH value stores at a lattice point (xa, yb, zc) on the LUT #5 equals the LCH value stored at a lattice point (xa+1, yb, zc), the lattice points (xa, yb, zc) and (xa+1, yb, zc) are grouped together as the group GP1.

Subsequent to the grouping process of FIG. 13, the LUT generator 2 searches for the uncompressed LCH values corresponding to the plurality of lattice points in each group, namely, the LCH values stored on the corresponding lattice points on the LUT #1 for each of the groups GP1, GP2, . . . in step F114. For example, as for the group GP1, the LCH values at the lattice point (xa, yb, zc) on the LUT #1 and the LCH values at the lattice point (xa+1, yb, zc) are read.

In step F115, a plurality of LCH values read from the LUT #1 are updated to enhance the maximum difference therebetween, and the updated LCH values overwrite the LUT #1.

Figure 14A:
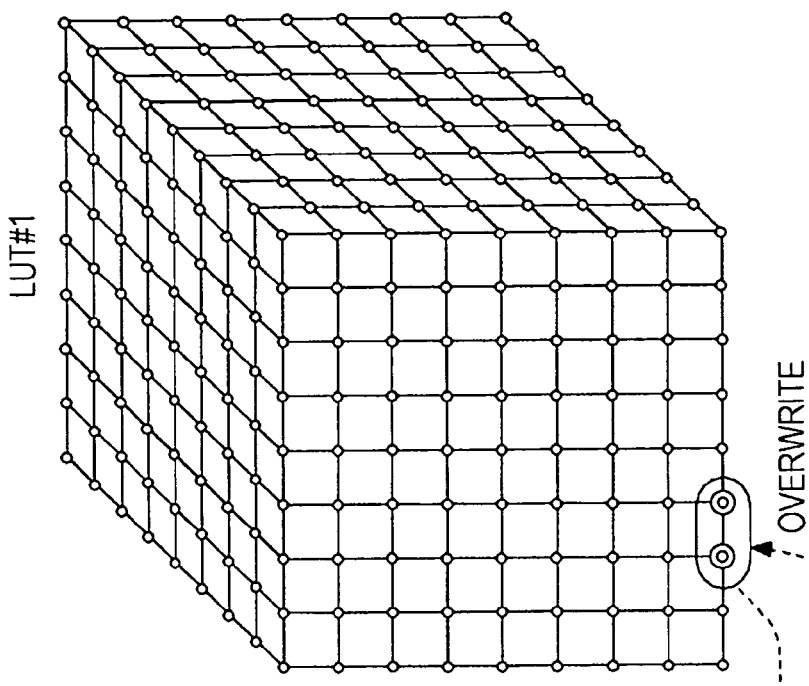
FIGS. 14A and 14B illustrate a update process for generating gradation in accordance with one embodiment of the present invention.
Figure 14B:
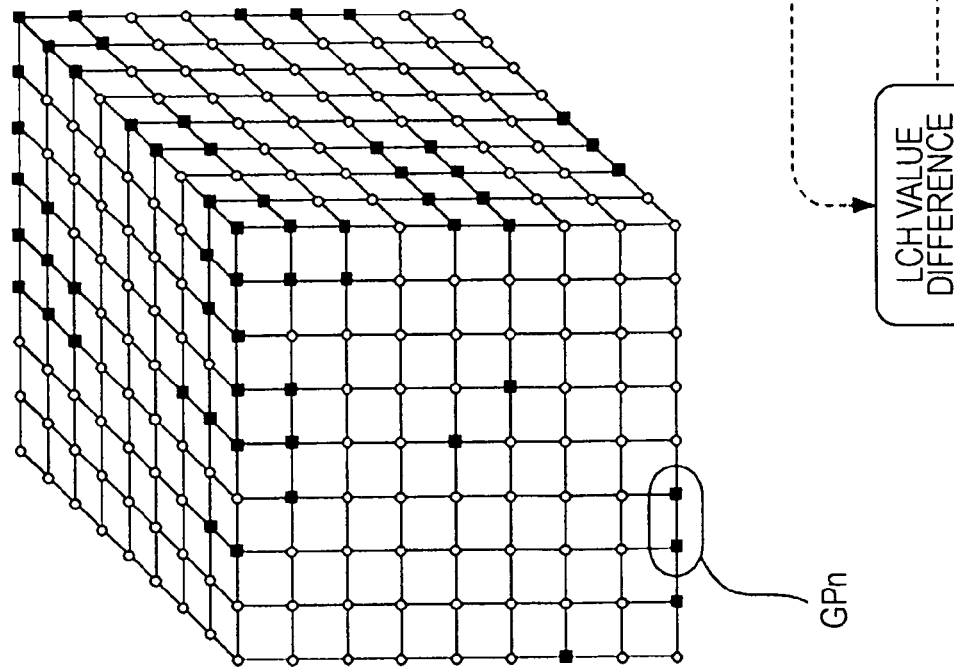

FIG. 14 diagrammatically illustrates that process. Now two lattice points represented group GPn on the LUT #5 of FIGS. 14A and 14B might be grouped together.

The LCH values at the corresponding two lattice points on the LUT #1 are read. The LCH values at the two lattice points are compared with L value with L value, C value with C value, and H value with H value in order to determine one giving the largest difference. For example, the LCH values on one lattice point on the LUT #1 are the L value=50, the C value=50, and the H value=10. The LCH values on the other lattice point on the LUT #1 are the L value=50, the C value=50, and the H value=11. Between the two sets of LCH values, the H value provides the largest difference.

The two colors originally offer characteristic difference in the H value. The LCH values are updated to enhance the difference. More specifically, operation is performed for H=H+D on one set of LCH values, and for H=H−D on the other set of LCH values. Value D enhances the difference in attribute. The value D will be described later.

By enhancing the difference in the H value, one set of LCH values (L value=50, C value=50, and H value=10) is modified to L value=50, C value=50, and H value=9, and the other set of LCH values (L value=50, C value=50, and H value=11) is modified to L value=50, C value=50, and H value=12. The modified values overwrite on the LUT #1 as represented by dual concentric circles.

The H value is modified herein. If the L value provides the largest difference between a plurality of lattice points in the group, the L value is modified. If the C value provides the largest difference, the C value is modified. When the L value is modified, L=L+D results on one set of the LCH values and L=L−D results on the other set of LCH values. When the V value is modified, C=C+D results on one set of the LCH values and C=C−D results on the other set of LCH values.

When the LCH values on the LUT #1 are modified in step F115, processing returns to step F104 to repeat the above-referenced process.

As for the lattice points having the same LCH value subsequent to the compression process, the uncompressed LCH values are modified so that the difference in the color is enhanced, and step F104 and subsequent steps are repeated. The lattice points are now likely to have different values in step F111. In other words, the colors, which suffers from gradation failure as a result of compression for the first time, may have gradation next.

From the relationship between the input gamut and the output gamut, however, the iterated process may not necessarily make all lattice points different in LCH value. Based on the premise that some lattice points having the same LCH value may remain on the LUT #5, the number of iteration processes of steps F104 through F115 may be limited to a certain number.

Figure 15:
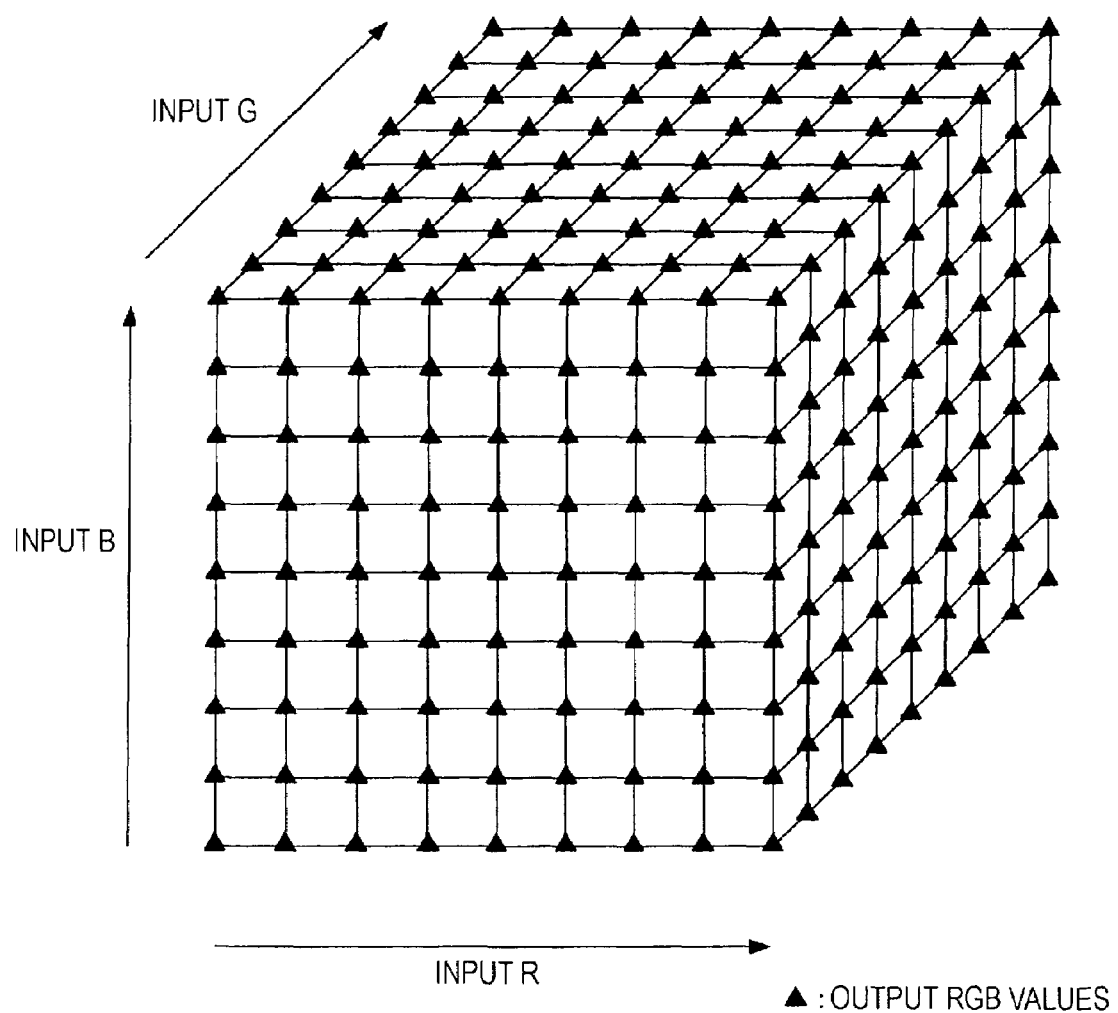
FIG. 15 illustrates generation of LUT #6 in accordance with one embodiment of the present invention.

If it is determined in step F112 that the same LCH value is not present in the lattice points on the LUT #5, processing proceeds to step F116. The LCH values stored at the lattice points of the LUT #5 at that moment are converted into the output RGB values, and the output RGB values are written onto the corresponding lattice points of the LUT #6. FIG. 15 illustrates that the output RGB values, represented by solid black triangles, and converted from the LCH values on the lattice points of the LUT #5 are written.

The LUT #6 is the 3DLUT finally created by the LUT generator 2, namely, supplied to the color converter 3 for use in the gamut compression process of the actual video data.

Upon completing the LUT #6 in step F116, the LUT generator 2 ends the LUT generation process by writing the LUT #6 onto the non-volatile memory area in the memory 12. The LUT #6 may be supplied to the color converter 3 later at any convenient time.

When the color converter 3 performs the gamut compression process on the input video data, the R value, the G value, and the B value of the input video data specify a single lattice point of the LUT #6. Since the output RGB values are stored at the lattice point, the color converter 3 reads the output RGB values and outputs the output RGB values as the gamut compressed values.

The output RGB values, represented by the solid black triangle symbols and written on the lattice points of the LUT #6 are RGB values converted from different LCH values, and are thus different from each other. Although the gamut compression device 1 performs the gamut compression process based on the clipping technique, gradation is maintained. Faithful reproduction is performed with reproducible color uncompressed while color gradation is maintained. Excellent gamut compression is thus performed.

Since all output values on the LUT #6 are made different, the LUT is effectively used, in other words, not wasted in the size thereof.

The compression process is performed with the input RGB values converted into the LCH values. Alternatively, the compression process is performed on the Lab values.

In the configuration of FIG. 2B, the LUT generator 30 generates the 3DLUT in the process of FIG. 5, and the 3DLUT is transferred to the color converter 32 in the gamut compression device 31. The gamut compression device 31 thus provides the same advantages as described above in the gamut compression process.

A second gamut compression process is now described.

Figure 16:
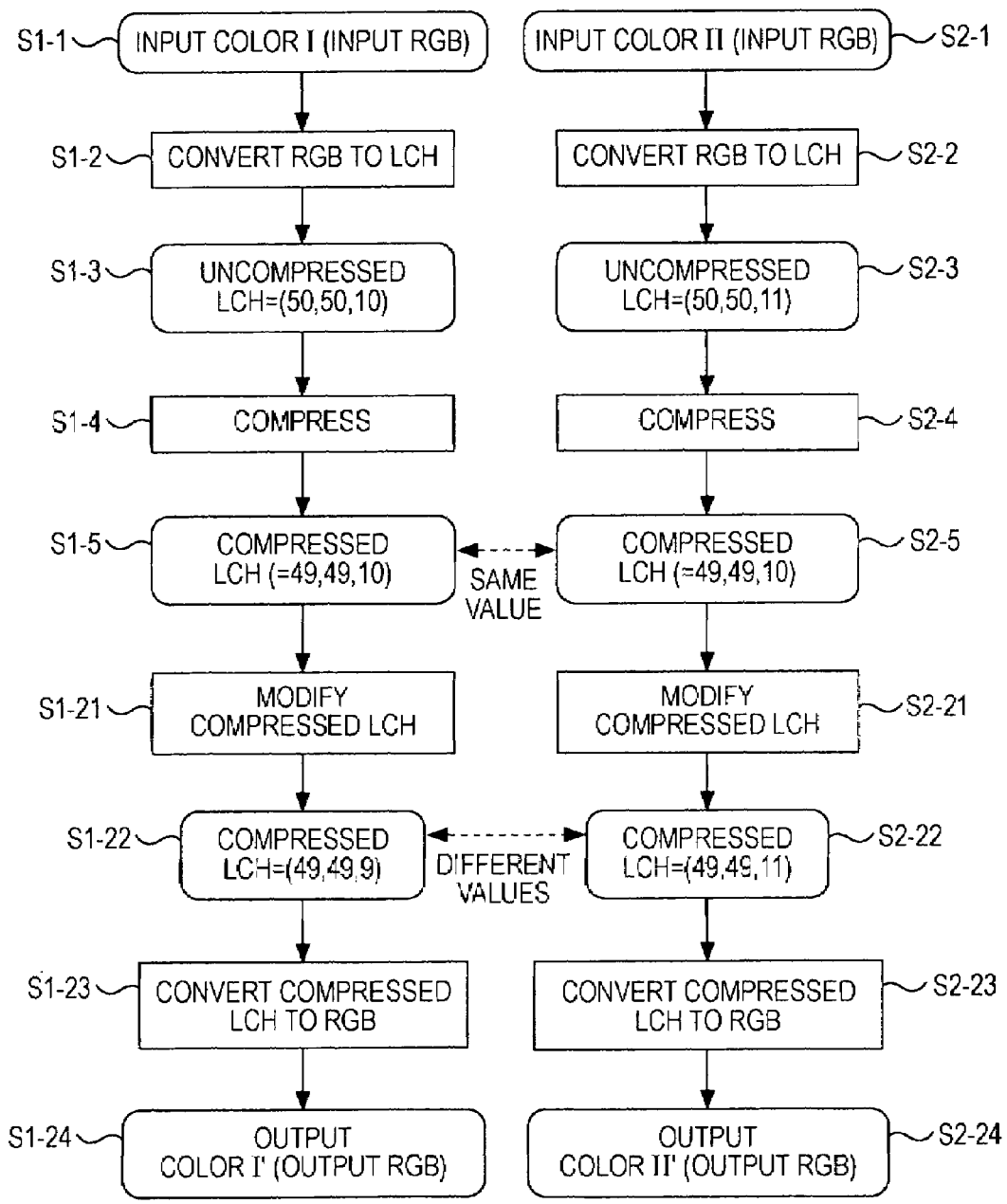
FIG. 16 illustrates a second gamut compression process in accordance with one embodiment of the present invention.

FIG. 16 illustrates the concept of the second gamut compression process. As in the process of FIG. 4, compression operation is performed on two input colors I and II contained in the input gamut as the input RGB values, and the input colors I and II are thus converted to colors I' and II' contained in the output gamut. Steps S1-1 through S1-5 and steps S2-1 through S2-5 remain the same as those of FIG. 4, and the discussion thereof is omitted herein. The concept of the second gamut compression process is different in steps S1-21 through S1-24 and steps S2-21 through S2-24 from the process of FIG. 4.

When the compression operation is performed on the colors I and II, the L value, the C value and the H value of the color I become 49, 49, and 10 and the L value, the C value and the H value of the color I also become 49, 49, and 10. In other words, when the compression operation is performed to contain the colors I and II in the output gamut, the same color results in the output gamut. In this state, color gradation is missing in the output gamut.

In the first gamut compression process, the uncompressed LCH values are modified, and the compression operation is repeated again. In the second gamut compression process, the compressed LCH values are modified to provide gradation (steps S1-21 and S2-21).

In this case, the uncompressed values of the LCH values becoming equal to each other subsequent to compression are recognized (steps S1-3 and S2-3), and an attribute providing the largest difference, from among the color attributes, are detected. This process step is identical to that of the first gamut compression process. However, the compressed LCH values are modified to enhance the difference in the second gamut compression process.

For example, the maximum difference is found in the H value in the uncompressed LCH values (steps S1-3 and S2-3). The uncompressed LCH values are modified to enhance the H value difference. As a result, the compressed LCH values of the color I are modified to be 49, 49, and 9, and the compressed LCH values of the color II are modified to be 49, 49, and 12 (steps S1-22 and S2-22).

The compressed LCH values of the colors I and II are converted into the RGB values (steps S1-23 and S2-23).

The converted RGB values, namely, output RGB values are colors I' and II' converted through the compression operation (steps S1-24 and S2-24).

In the second gamut compression process as well, the compression operation may be performed on the Lab values rather than on the LCH values converted from the RGB values. The color attribute difference is enhanced as the LCH values. Alternatively, a difference in the Lab values may be enhanced or a difference in the color component (RGB values) may be enhanced. It is important that the output RGB values of the colors I' and II' be different.

As understood from the color I and the color II of FIG. 16, the gamut compression process of the present embodiment is based on the concept that a plurality of pieces of color data in the input gamut becoming the same in value subsequent to compression are set to be different with the color component or the color attribute providing the largest difference, from among the color components or the color attributes prior to compression, being enhanced.

To make the plurality of pieces of color data different in value, the compression process is performed on the plurality of color data having the same value with the compressed value thereof modified. The compressed color data values become thus different.

The second gamut compression process is specifically described with reference to FIG. 17.

Figure 17:
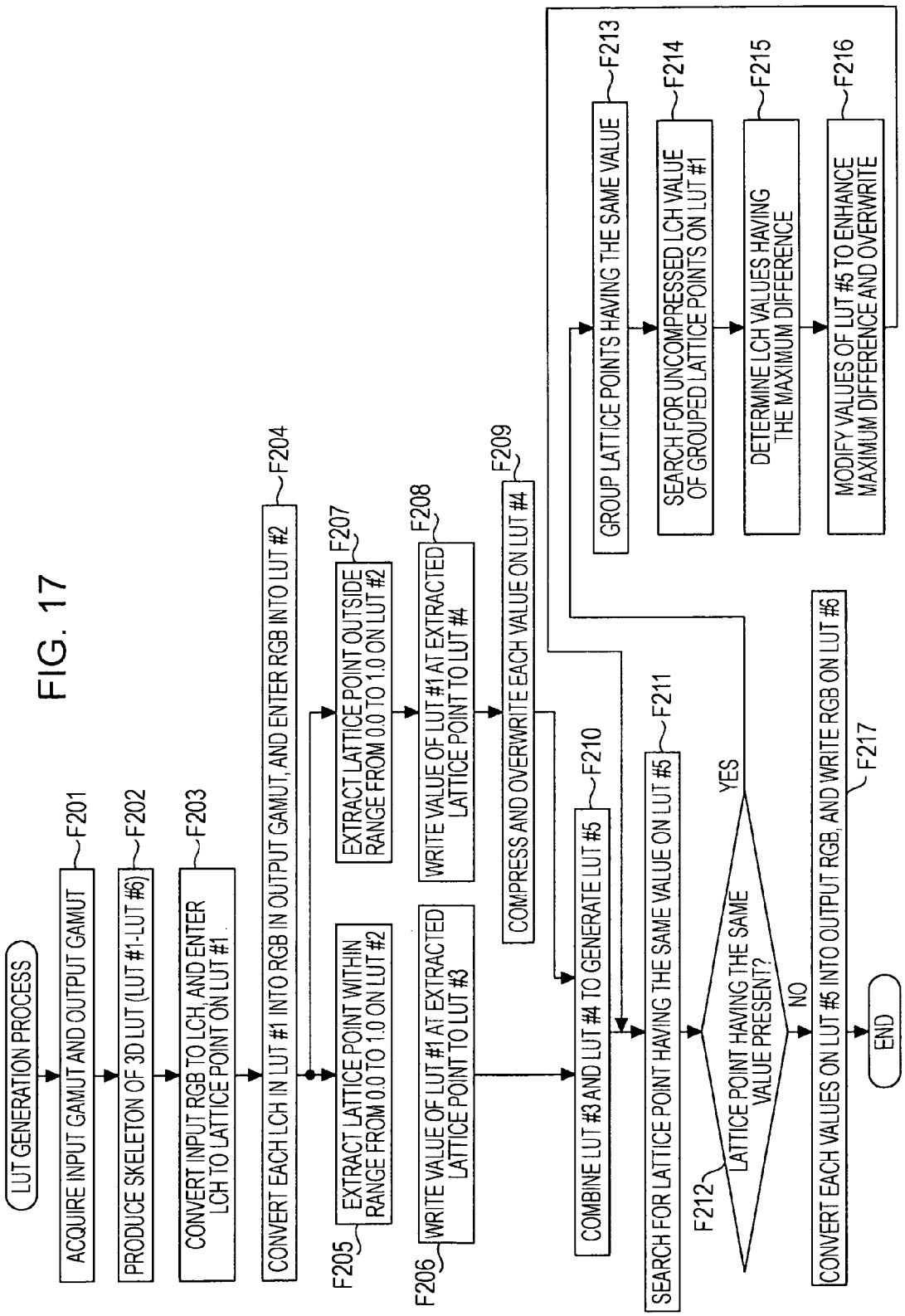
FIG. 17 is a flowchart of a LUT generation process to perform the second gamut compression process in accordance with one embodiment of the present invention.

Steps F201 through F217 of FIG. 17 are performed by the LUT generator 2. Individual steps are performed using internal functions of the LUT generator 2 as below.

Steps F201 and F202 are performed by the memory controller 25 in the memory access function thereof.

Steps F203, F204, and F217 are performed by the converter 21 in the conversion function thereof and by the memory controller 25 in the memory access function thereof.

Steps F205, F206, F207, and F208 are performed by the gamut boundary determiner 22 in the determination function thereof and by the memory controller 25 in the memory access function thereof.

Step F209 is performed by the gamut compressor 23 in the compression calculation function thereof and by the memory controller 25 in the memory access function thereof.

Steps F210, F211, F212, F213, F214, F215 and F216 are performed by the color gradation generator 24 in the gradation generation function thereof and by the memory controller 25 in the memory access function thereof.

As shown in FIG. 17, steps F201 through F214 and F217 are respectively identical to steps F101 through F114 and F116 of FIG. 5, and the discussion thereof is omitted herein.

In step F213, the grouping operation is performed as shown in FIG. 13 in the LUT generation process of FIG. 17. The LUT generator 2 searches for the uncompressed LCH values corresponding to the plurality of lattice points in a group, namely, the LCH values stored at the corresponding lattice points of LUT #1 in step F214. In the group GP1, for example, the LCH values at a lattice point (xa, yb, zc) and the LCH values at a lattice point (xa+1, yb, zc) on the LUT #1 are read.

In step F215, a value having the largest difference from among a plurality of LCH values read from the LUT #1 is determined. In step F216, the LCH values of the LUT #5 are modified so that the largest difference of the value is enhanced, and the modified LCH values overwrite the LUT #5.

FIG. 18 diagrammatically illustrates the above process. Through step F213, two lattice points represented by group GPn are grouped together on the LUT #5 of FIG. 18.

The LCH values at the same two lattice points of the LUT #1 are read. The LCH values at the two lattice points are compared with the L value with the L value, the C value with the C value, and the H value with the H value. The value providing the largest difference is determined. For example, the LCH values on one lattice point on the LUT #1 are the L value=50, the C value=50, and the H value=10. The LCH values on the other lattice point on the LUT #1 are the L value=50, the C value=50, and the H value=11. Between the two sets of LCH values, the H value provides the largest difference.

The two colors originally offer characteristic difference in the H value. The LCH values are updated to enhance the difference on the LUT #5.

More specifically, operation is performed for H=H+D on one set of LCH values, and for H=H−D on the other set of LCH values. Value D enhances the difference in attribute.

For example, the LCH values at the two lattice points in the group GPn on the LUT #5 are the same, namely, the L value=49, the V value=49, and the H value=10. Since the LCH values on the LUT #1 provide the largest difference in the H value on the LUT #1, one set of LCH values in the GPn on the LUT #5 are modified to be the L value=49, the C value=49, and the H value=11, and the other set of LCH values in the GPn on the LUT #5 are modified to be the L value=49, the C value=49, and the H value=9, and the modified LCH values overwrite on the LUT #5.

The H value is modified herein. If the L value from among the uncompressed LCH values provides the largest difference between the plurality of lattice points within the group, the L value is modified. If the C value provides the largest difference, the C value is modified.

After the modification of the LCH values of the LUT #5 in step F216, processing returns to step F211. Lattice points having the same LCH values on the LUT #5 are searched for, and the same process is repeated.

Concerning the lattice points having the same LCH values subsequent to the compression operation, an attribute value providing the largest difference in the uncompressed LCH values is determined. The compressed LCH values on the LUT #5 are then modified so that a difference appears therebetween. Through iterating the process of steps F211 through F216, it is determined in step F212 there are no lattice points having the same LCH values on the LUT #5.

If it is determined in step F212 that there are no lattice points having the same LCH values on the LUT #5, processing proceeds to step F217. The LCH values stored at the lattice points on the LUT #5 at that moment are converted into the RGB values, and the resulting RGB values are written on the same lattice points on the LUT #6.

The LUT #6 is the 3DLUT finally created by the LUT generator 2, namely, supplied to the color converter 3 for use in the gamut compression process of the actual video data.

Upon completing the LUT #6 in step F217, the LUT generator 2 ends the LUT generation process by writing the LUT #6 onto the non-volatile memory area in the memory 12. The LUT #6 may be supplied to the color converter 3 later at any convenient time.

When the color converter 3 performs the gamut compression process on the input video data, the R value, the G value, and the B value of the input video data specify a single lattice point of the LUT #6. Since the output RGB values are stored at the lattice point, the color converter 3 reads the output RGB values and outputs the output RGB values as the gamut compressed values.

The output RGB values written on the lattice points of the LUT #6 are RGB values converted from different LCH values, and are thus different from each other. Although the gamut compression device 1 performs the gamut compression process based on the clipping technique, gradation is maintained. Faithful reproduction is performed with reproducible color uncompressed while color gradation is maintained. Excellent gamut compression is thus performed.

Since all values on the LUT #6 become different, the LUT is effectively used.

The 3DLUT (LUT #6) is created through the process of FIG. 5 or FIG. 17. Although the gamut compression is performed using the clipping technique, gradation is maintained. The previously discussed D value is preferably set to maintain gradation when the LCH values (uncompressed LCH values) on the LUT #1 are modified in step F115 of FIG. 5, or when the LCH values (compressed LCH values) on the LUT #5 are modified in step F216 of FIG. 17.

When the LCH values are modified to enhance the difference in the L value, L=L+D results on one set of LCH values and L=L−D results on the other set of LCH values as previously discussed. The D value is intended to enhance the difference in the original attribute that happens to have the same value as a result of compression. With an appropriate D value set, the original gradation is still expressed even after the gamut compression process.

The method of enhancement using the D value is not limited to the above-referenced addition and subtraction method. Any other method is also acceptable if the method can enhance the difference. The D value is not necessarily a fixed one.

Methods of determining the D value, representing the degree of enhancement, are described below.

Degree of Enhancement Determined by Color Component and Color Attribute

An R value of 8 bits is considered. An 8-bit R value is referred to as Ri (i=0-255). For each of the 255 Ri values, the G value and the B value are fixed, and then the L value, the a value, the b value, the C value, and the H value are calculated.

Let Li, ai, bi, Ci, and Hi represent the values calculated from Ri, and Li, ai, and bi are calculated from the following equation (5):

$$\begin{bmatrix} X_i \\ Y_i \\ Z_i \end{bmatrix} = [M_l] \begin{bmatrix} R_i \\ G \\ B \end{bmatrix} \qquad \text{Equation (5)}$$

$$L_i = 116(Y_i/Y_n)^{1/3} - 16$$
$$a_i = 500\{(X_i/X_n)^{1/3} - (Y_i/Y_n)^{1/3}\}$$
$$b_i = 200\{(Y_i/Y_n)^{1/3} - (Z_i/Z_n)^{1/3}\}$$
$$i = 0 - 255(8 \text{ bit})$$

where Xn, Yn, and Zn are tristimulus values of a light source, and (xn, Yn, Zn)=(95.04, 100.00, 108.89) in the case of standard illuminant $D_{65}$.

Furthermore, Ci and Hi are calculated from the following equation (6):

$$C_i = \sqrt{a_i^2 + b_i^2}$$

$$H_i = \arctan(b_i/a_i) \qquad \text{Equation (6)}$$

ΔLi, Δai, Δbi, ΔCi and ΔHi are determined as below from Li, ai, bi, Ci, and Hi thus calculated:

$$\Delta L_i = |L_i - L_{i-1}|$$

$$\Delta a_i = |a_i - a_{i-1}|$$

$$\Delta b_i = |b_i - b_{i-1}|$$

$$\Delta C_i = |C_i - C_{i-1}|$$

$$\Delta H_i = |H_i - H_{i-1}|$$

A two-dimensional table (LUT-i) of FIG. 19A is created for i=0-255 using ΔLi, Δai, Δbi, ΔCi, and ΔHi determined from the R value.

Similarly, as for the G value, Li, ai, bi, Ci and Hi are determined for each Gi (i=0-255) with the R value and the B value fixed, and further ΔLi, Δai, Δbi, ΔCi and ΔHi are determined. A two-dimensional table (LUT-ii) of FIG. 9B is thus created.

Similarly, as for the B value, Li, ai, bi, Ci and Hi are determined for each Bi (i=0-255) with the R value and the G value fixed, and further ΔLi, Δai, Δbi, ΔCi and ΔHi are determined. A two-dimensional table (LUT-iii) of FIG. 9C is thus created.

The two-dimensional table (LUT-i) of FIG. 19A is a table of the D value for generating a difference of 1 in the R value. More specifically, the LUT-i is table data that indicates how much each of the L value, the a value, the b value, the C value, and the H value needs to be changed to enhance the difference in the R value. The LUT-i indicates a value usable as the D value.

The two-dimensional table (LUT-ii) of FIG. 19B is a table of the D value generating a difference of 1 in the G value. The two-dimensional table (LUT-iii) of FIG. 19C is a table of the D value generating a difference of 1 in the B value.

Which of the two-dimensional tables of FIGS. 9A, 9B and 9C to use to set the D value is left to design matter.

The D value causes a difference on a plurality of colors that has become the same in value through the compression operation in the gamut compression process (LUT generation process). If a difference is desired in the R value, the D value is determined from the two-dimensional table (LUT-i) of FIG. 19A. The D value may be selected depending on output device, vision characteristic, input video data, etc.

The D value may be fixed or variable. If gradation is desired to be maintained with the difference in the R value enhanced and if the D value is fixed, an appropriate D value may be selected from the two-dimensional table (LUT-i).

To make the D value variable, a D value may be selected from the two-dimensional table (LUT-i) in the course of process.

Degree of Enhancement Determined Based on Color Attribute

As previously discussed, the D value causes any one of the attribute values, namely, the L value, the C value, and the H value to vary. The D value may be varied depending on the attribute to be changed. For example, when the L value is varied, a DL is used as L=L+DL and L=L−DL. When the H value is varied, a DH value is used as H=H+DH and H=H−DH. When the C value is varied, a DC value is used as C=C+DC and C=C−DC.

As the DL value, a maximum ΔL within a range of i=0 to 255 in the two-dimensional table (LUT-i) of FIG. 19A may be selected. The same is true of the DH value and the DC value.

When the color data value is varied using the a value and the b value, a Da value may be used to perform the addition and subtraction operation on the a value, and a Db value may be used to perform the addition and subtraction operation on the b value.

Degree of Enhancement Determined Based on a Combination of Gamut of Compression Source (Input Gamut) and Gamut of Compression Destination (Output Gamut)

The D value depending on the combination of the input gamut and the output gamut is determined on the two-dimensional tables by setting the matrix Ml of equation (5) in response to the combination of the input gamut and the output gamut.

Degree of Enhancement Determined Based on the Gamut of Compression Destination (Output Gamut)

The gamut is wide or narrow depending on the device as shown in FIG. 20. The D value is determined depending on the width of the gamut.

For example, if the output gamut is as narrow as ITU-709, the D value is set to be large. If the output gamut is as wide as film color, the D value is set to be small.

Degree of Enhancement Determined Based on the Lattice Points of the 3DLUT

The D value is selected from the two-dimensional tables of FIGS. 19A-19C depending on the lattice points of the LUT #1 and the LUT #5, namely, the lattice points having the LCH values to be varied.

Degree of Enhancement Determined Based on Bit Length

A variation of i in the creation of the two-dimensional LUT is set depending on the bit length of the RGB values. For example, in an 8-bit RGB system, i=0-255, in a 10-bit RGB system, i=0-1024, in a 12-bit RGB system, i=0-4096, and in a 16-bit RGB system, i=0-65535. A two-dimensional table indicating the D value is created, and the D value is determined from the two-dimensional table.

A program of one embodiment of the present invention is executed by the arithmetic unit 10 (LUT generator 2) of FIGS. 5 and 17. Furthermore, a program of another embodiment of the present invention causes the color converter 3 to perform the gamut compression process on the input video data using the 3DLUT (LUT #6) created by the LUT generator 2.

The programs may be stored on the ROM area or the non-volatile area in the memory 12.

The program of the embodiments of the present invention may be pre-recorded on a personal computer, a hard disk drive as a recording medium contained in an apparatus of a video editing system, or a ROM in a microcomputer having a CPU.

The program of the embodiments of the present invention may also be temporarily or permanently stored on one of removable recording media including a flexible disk, compact disc read-only memory (CD-ROM), magneto-optical (MO) disk, digital versatile disk (DVD), blu-ray disk, magnetic disk, semiconductor memory, and memory card. Such a removable recording medium may be supplied in package software.

The program of the embodiments of the present invention may be installed to a personal computer from the removable recording medium, or may be downloaded to the personal computer from a download site via a network such as a local area network (LAN) or the Internet.

With the program of the embodiments of the present invention, the gamut compression device providing the above-described advantages is easily embodied. The gamut compression device may be embodied by a general-purpose or dedicated information processing apparatus.

A program recording medium storing the program helps the gamut compression device of the above-described embodiments to be easily provided or to be distributed.

It should be understood by those skilled in the art that various modifications, combinations, sub-combinations and alterations may occur depending on design requirements and other factors insofar as they are within the scope of the appended claims or the equivalents thereof.

What is claimed is:

1. A gamut compression method for compressing video data in a first gamut into video data in a second gamut, comprising the steps of:

compressing a value of color data in the first gamut, not contained in the second gamut, into a value of color data contained in the second gamut through a predetermined compression calculation, utilizing a gamut compression device; and generating gradation in a manner such that a plurality of pieces of color data having the same value as a result of the compression in the compressing step become different in value in the second gamut, utilizing a color gradation generator, wherein the gradation generating step comprises modifying the plurality of pieces of color data having the same value to be different in value by enhancing one of a color component and a color attribute having a maximum difference in the state thereof prior to the compressing step so that the maximum difference is enlarged.

2. The gamut compression method according to claim 1, wherein the gradation generating step comprises:

modifying the plurality of pieces of color data having the same value in value in the state thereof prior to the compressing step, and the compressing step is repeated with the modified color data so that the values of the color data become different subsequent to the compressing step.

3. The gamut compression method according to claim 1, wherein the gradation generating step comprises:

modifying the plurality of pieces of color data having the same value in value subsequent to the compressing step so that the values of the color data become different.

4. The gamut compression method according to claim 1, further comprising:

compressing the video data in the first gamut into the video data in the second gamut by referencing a lookup table that represents mapping between the color data value in the first gamut and the color data value in the second gamut, the lookup table obtained through the compressing step and the gradation generating step.

5. The gamut compression method according to claim 1, further comprising:

a table generating step of generating a lookup table that represents mapping between the color data value in the first gamut and the color data value in the second gamut, the lookup table obtained through the compressing step and the gradation generating step, wherein the video data in the first gamut is compressed into the video data in the second gamut by referencing the lookup table generated in the table generating step.

6. A gamut compressing device for compressing video data in a first gamut into video data in a second gamut, comprising:

compression means for compressing a value of color data in the first gamut, not contained in the second gamut, into a value of color data contained in the second gamut through a predetermined compression calculation; and gradation generating means for generating gradation so that a plurality of values of color data having the same value as a result of the compression in the compressing step become different in value in the second gamut, wherein the gradation generating means modifies the plurality of pieces of color data having the same value to be different in value by enhancing one of a color component and a color attribute having a maximum difference in the state thereof prior to compressing process performed by the compression means so that the maximum difference is enlarged.

7. A gamut compressing device for compressing video data in a first gamut into video data in a second gamut, comprising:

a compression unit compressing a value of color data in the first gamut, not contained in the second gamut, into a value of color data contained in the second gamut through a predetermined compression calculation; and a gradation generating unit generating gradation so that a plurality of values of color data having the same value as a result of the compression in the compressing step become different in value in the second gamut, wherein the gradation generating unit modifies the plurality of pieces of color data having the same value to be different in value by enhancing one of a color component and a color attribute having a maximum difference in the state thereof prior to compressing process performed by the compression unit so that the maximum difference is enlarged.

* * * * *